(12) United States Patent
Su et al.

(10) Patent No.: US 11,470,636 B2
(45) Date of Patent: Oct. 11, 2022

(54) COMMUNICATION METHOD, COMMUNICATIONS DEVICE, AND NETWORK DEVICE

(71) Applicant: HUAWEI TECHNOLOGIES CO., LTD., Guangdong (CN)

(72) Inventors: Yuwan Su, Beijing (CN); Zhihu Luo, Beijing (CN); Zhe Jin, Beijing (CN); Weiliang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/991,351

(22) Filed: Aug. 12, 2020

(65) Prior Publication Data
US 2020/0374925 A1    Nov. 26, 2020

Related U.S. Application Data

(63) Continuation of application No. PCT/CN2018/076566, filed on Feb. 12, 2018.

(51) Int. Cl.
*H04W 74/00* (2009.01)
*H04B 1/713* (2011.01)
(Continued)

(52) U.S. Cl.
CPC .......... *H04W 74/008* (2013.01); *H04B 1/713* (2013.01); *H04L 27/2607* (2013.01); *H04W 74/0833* (2013.01)

(58) Field of Classification Search
CPC ........... H04W 74/008; H04W 74/0833; H04W 74/08; H04B 1/713; H04B 1/7143; H04L 27/2607
See application file for complete search history.

(56) References Cited

U.S. PATENT DOCUMENTS

2017/0187499 A1    6/2017  Hwang et al.
2018/0131547 A1*   5/2018  Wang .................... H04L 5/0053
2019/0373646 A1*  12/2019  Shin ..................... H04L 5/0007

FOREIGN PATENT DOCUMENTS

CN        101686560 A    3/2010
CN        106162921 A   11/2016
(Continued)

OTHER PUBLICATIONS

Huawei, HiSilicon, "On uplink TDD NB-IoT," 3GPP TSG RAN WG1 Meeting #91, R1-1719478, Reno, USA, Nov. 27-Dec. 1, 2017, 7 pages.

(Continued)

*Primary Examiner* — Kibrom T Hailu
*Assistant Examiner* — Nizam U Ahmed
(74) *Attorney, Agent, or Firm* — Fish & Richardson P.C.

(57) ABSTRACT

Example communication methods and apparatus are described. One example method includes determining a random access preamble by a terminal device. The random access preamble includes six symbol groups. The terminal device determines a frequency location of the random access preamble based on random access configuration information and a preset rule. A frequency hopping interval between a first symbol group and a second symbol group and a frequency hopping interval between a fifth symbol group and a sixth symbol group are equal and are first intervals. A frequency hopping interval between the second symbol group and a third symbol group and a frequency hopping interval between a fourth symbol group and the fifth symbol group are equal and are second intervals. A frequency hopping interval between the third symbol group and the fourth symbol group is a third interval. The random access preamble is sent based on the frequency location.

28 Claims, 10 Drawing Sheets

(51) Int. Cl.
  *H04L 27/26* (2006.01)
  *H04W 74/08* (2009.01)

(56) References Cited

FOREIGN PATENT DOCUMENTS

| CN | 104904300 B | 10/2019 |
|---|---|---|
| KR | 20170080597 A | 7/2017 |
| RU | 2417550 C2 | 4/2011 |
| RU | 2491794 C1 | 8/2013 |
| WO | 2017074254 A1 | 5/2017 |
| WO | 2017119943 A1 | 7/2017 |
| WO | 2017131577 A1 | 8/2017 |

OTHER PUBLICATIONS

Huawei, HiSilicon, "NPRACH enhancement for cell radius extension," 3GPP TSG RAN WG1 Meeting #91, R1 -1719480, Reno, USA, Nov. 27-Dec. 1, 2017, 8 pages.
Office Action issued in Korean Application No. 2020-7025470 dated Sep. 15, 2021, 8 pages (with English translation).
Huawei et al., "NPRACH enhancement for cell radius extension," 3GPP TSG RAN WG1 Meeting #92, R1-1801446, Athens, Greece, Feb. 26-Mar. 2, 2018, 7 pages.
Huawei et al., "NPRACH enhancement for cell radius extension," 3GPP TSG RAN WG1, Meeting #92bis, R1-1803879, Sanya, China, Apr. 16-20, 2018, 7 pages.
Office Action in Chinese Application No. 201880088667.8, dated Jun. 16, 2021, 7 pages.
Office Action issued in Russian Application No. 2020129520/07(053012) dated Apr. 22, 2021, 18 pages (with English translation).
3GPP TS 36.211 V15.0.0 (Dec. 2017), "3rd Generation Partnership Project;Technical Specification Group Radio Access Network;Evolved Universal Terrestrial Radio Access (E-UTRA);Physical channels and modulation(Release 15)," Dec. 2017, 220 pages.
3GPP TS 36.331 V15.0.1 (Jan. 2018), 3rd Generation Partnership Project;Technical Specification Group Radio Access Network;Evolved Universal Terrestrial Radio Access (E-UTRA);Radio Resource Control (RRC);Protocol specification (Release 15), Jan. 2018, 776 pages.
Ericsson, "NB-IoT Single Tone Frequency NB-PRACH Design," 3GPP TSG-RAN1 #84, R1-160275, Feb. 15-19, 2016, Total 10 Pages.
Huawei et al., "NB-PRACH design," 3GPP TSG RAN WG1 Meeting #84, R1-161357,St. Julians, Malta, Feb. 15-19, 2016, 8 pages.
Huawei et al., "New WID on Further NB-IoT enhancements," #3GPP TSG RAN Meeting #75, RP-170852, Dubrovnik, Croatia, Mar. 6-9, 2017, 6 pages.
PCT International Search Report and Written Opinion issued in International Application No. PCT/CN2018/076566 dated Jul. 23, 2018, 17 pages (with English translation).
Ericsson, "NPRACH reliability for NB-IoT," 3GPP TSG-RAN WG1 #88bis, R1-1705185, Spokane, USA, Apr. 3-7, 2017,4 pages.
Office Action issued in Chinese Application No. 201880088667.8 dated Jan. 18, 2021, 8 pages.
Extended European Search Report issued in European Application No. 18904735.0 dated Jan. 13, 2021, 9 pages.
Huawei et al., "On support of larger cell radius for NPRACH," 3GPP TSG RAN WG1 Meeting #90, R1-1712117, Prague, Czech Republic, Aug. 21-25, 2017, 9 pages.
Zte et al., "NPRACH range enhancement," 3GPP TSG RAN WG1 Meeting #91, R1-1719729, Reno, USA, Nov. 27-Dec. 1, 2017, 9 pages.
Zte et al., "Improved frequency hopping randomization for NPRACH," 3GPP TSG RAN WG1 Meeting #90, R1-1717193, Prague, Czech Republic, Oct. 9-13, 2017, 8 pages.

\* cited by examiner

COMMUNICATION METHOD, COMMUNICATIONS DEVICE, AND NETWORK DEVICE

CROSS-REFERENCE TO RELATED APPLICATIONS

This application is a continuation of International Application No. PCT/CN2018/076566, filed on Feb. 12, 2018, the disclosure of which is hereby incorporated by reference in its entirety.

TECHNICAL FIELD

This application relates to the communications field, and more specifically, to a communication method, a communications device, and a network device.

BACKGROUND

In a narrowband internet of things (NB-IoT), a random access procedure is an important method for a terminal device to change from an idle mode to a connected mode by obtaining a dedicated channel resource. A narrowband Physical random access channel (NPRACH) is a channel for transmitting a random access request. The random access procedure is classified into a contention-based random access procedure and a non-contention-based random access procedure. Regardless of the contention-based random access procedure or the non-contention-based random access procedure, a random access preamble needs to be sent on the NPRACH in a first step to notify a network device that there is one random access request. At the same time, the network device can estimate a transmission latency between the network device and the terminal to calibrate uplink timing based on the transmission latency.

In the existing NB-IoT, the random access preamble supports a cell radius of 40 kilometers (km). For an application oriented for an open area in an internet of things, for example, a smart lake or co-site with a long term evolution (LTE) system, the random access preamble needs to support a larger cell. To support a larger cell radius, a format of the random access preamble needs to be redesigned. However, a current frequency hopping pattern of the random access preamble may not be applicable to a redesigned random access preamble.

SUMMARY

This application provides a communication method, a communications device, and a network device, to perform random access based on a frequency hopping pattern that matches a redesigned random access preamble.

According to a first aspect, a communication method is provided. The method includes: determining, by a terminal device, a random access preamble, where the random access preamble includes six symbol groups, and the six symbol groups include a first symbol group, a second symbol group, a third symbol group, a fourth symbol group, a fifth symbol group, and a sixth symbol group;

determining, by the terminal device, a frequency location of the random access preamble based on random access configuration information and a preset rule, where a frequency interval between every two adjacent symbol groups in the six symbol groups is a frequency hopping interval, a frequency hopping interval between the first symbol group and the second symbol group and a frequency hopping interval between the fifth symbol group and the sixth symbol group are equal and both are first intervals, a frequency hopping interval between the second symbol group and the third symbol group and a frequency hopping interval between the fourth symbol group and the fifth symbol group are equal and both are second intervals, a frequency hopping interval between the third symbol group and the fourth symbol group is a third interval, and the first interval, the second interval, and the third interval are unequal and are not equal to zero; and sending, by the terminal device, the random access preamble to a network device based on the frequency location.

Therefore, according to the communication method in this embodiment of this application, the terminal device determines a frequency hopping pattern (namely, a frequency location of each symbol group) of the random access preamble including the six symbol groups, to send the random access preamble and perform random access.

It should be understood that a frequency hopping interval is a frequency interval between two adjacent symbol groups in time domain, or the frequency hopping interval is an absolute value of a frequency difference between the two adjacent symbol groups in time domain.

It should be further understood that the frequency location in this application indicates an index or a number of a subcarrier. A frequency location interval between every two adjacent symbol groups is an absolute value of a difference between frequency locations. A frequency hopping interval between two adjacent symbol groups is equal to a value obtained by multiplying a frequency location interval between the two adjacent symbol groups by a subcarrier bandwidth. The frequency location may be a relative frequency location or an absolute frequency location. A relative frequency location of a symbol group is a difference between an absolute frequency location and an offset frequency location of the symbol group. Correspondingly, the absolute frequency location of the symbol group is a sum of the relative frequency location and the offset frequency location of the symbol group. It should be understood that the terminal device sends the random access preamble on a frequency corresponding to the absolute frequency location of the symbol group.

Herein, the offset frequency location may be specified in a protocol or notified by the network device. This is not limited in this application. For example, the network device may use the random access configuration information to carry the offset frequency location.

Optionally, le frequency hopping interval may be an integer multiple of the subcarrier bandwidth. For example, if the subcarrier bandwidth is 1.25 kHz, the frequency hopping interval between the adjacent symbol groups may be N*1.25 kHz, where N is a positive integer. Alternatively, the frequency hopping interval between the adjacent symbol groups may not be the integer multiple of the subcarrier bandwidth. Whether the frequency hopping interval between the adjacent symbol groups is the integer multiple of the subcarrier bandwidth is not limited in this application.

Optionally, a frequency hopping range of the random access preamble is 36 subcarriers.

An existing random access preamble may be used for frequency hopping in 12 subcarriers (namely, 45 kHz). When a subcarrier bandwidth is reduced from 3.75 kHz to 1.25 kHz in this embodiment of this application, on a basis that an NPRACH resource of 45 kHz is maintained, the frequency hopping range of the random access preamble in this application may be increased from 12 subcarriers to 36 subcarriers. Therefore, a frequency hopping solution provided in this application can support more users in reusing the NPRACH resource to perform the random access. In other words, compared with an existing solution with 45 kHz supporting 12 users, this application can support reuse by 36 users.

Optionally, any one of the six symbol groups included in the random access preamble may include one cyclic prefix (CP) and one symbol, one CP and two symbols, or one CP and three symbols. Time lengths of both the CP and the symbol herein may be 800 microseconds (μs). The random access preamble may support a larger cell radius.

A maximum cell radius is related to a guard time (GT). A longer guard time indicates a larger covered maximum cell radius. The guard time is related to the CP and a total length of symbols in the symbol group. In addition, the time length of the CP should cover the maximum cell radius. According to a formula S=V*T, V is a speed of light of $3.0*10^8$ m/s, and $S=2*100*10^3$ m. Therefore, T=666.7 μs may be obtained by substituting the two values into the formula S=V*T. However, the time length $T_{CP}$ of the CP is 800 μs, and is greater than 666.7 μs. Therefore, in this application, a format of the random access preamble is set, so that the random access preamble can support the larger cell radius, which is approximately 100 km.

Further, a sequence carried on each symbol in the symbol group may be the same. For example, the sequence carried on each symbol is a, and sequences that may be carried on E symbols are $$\underbrace{a, a, \ldots a}_{E},$$

where a may be a real number, for example, 1 or −1, or a may be a complex number, for example, j or −j, and j represents an imaginary unit, and satisfies $j^2=-1$. Sequences carried on the symbols in the symbol group may be different, or sequences carried on some symbols in the symbol group may be the same, and sequences carried on the other symbols may be different.

In addition, sequences carried in any two symbol groups may be the same, or may be different.

The random access preamble in this application may be a random access preamble that is not scrambled by using a scrambling sequence, or may be a random access preamble that is scrambled by using a scrambling sequence. Scrambling is performed to improve interference randomization performance and avoid a false alarm caused by inter-cell interference.

A length of a scrambling code sequence obtained by the terminal device based on a base sequence may have a plurality of cases. Specifically, the length of the scrambling code sequence may be the same as the quantities of symbols in a symbol group of the random access preamble, the length of the scrambling code sequence may be the same as the quantities of symbols in a repetition period of the random access preamble, or the length of the scrambling code sequence may be the same as the quantities of symbols in all repetition periods of the random access preamble. The length of the scrambling code sequence may be the same as a sum of a cyclic prefix and the quantity of symbols in the symbol group of the random access preamble, the length of the scrambling code sequence may be the same as a sum of a cyclic prefix and the quantity of symbols in the repetition period of the random access preamble, or the length of the scrambling code sequence may be the same as a sum of cyclic prefixes and the quantity of symbols in all the repetition periods of the random access preamble. The length of the scrambling code sequence is not limited in this application.

The terminal device may generate the base sequence in a manner that is set inside the terminal device, or obtain the base sequence through query. There may be a plurality of methods for the terminal device to obtain the scrambling code sequence based on the base sequence. In an optional method 1, the scrambling sequence is the base sequence, and the scrambling sequence and the base sequence are equal. For example, the base sequence is ABC, and the obtained scrambling code sequence is ABC. In an optional method 2, each element in the base sequence is sequentially repeated for M times to obtain the scrambling code sequence. To be specific, the terminal device repeats a first element in the base sequence for M times, repeats a second element for M times, . . . and repeats a last element for M times. For another example, the base sequence is ABC, each element in the base sequence is sequentially repeated twice to obtain AABBCC. For example, the base sequence is AB, and each element in the base sequence is sequentially repeated three times to obtain AAABBB.

The terminal device may obtain scrambling code indication information sent by the network device. The scrambling code indication information is used to indicate the terminal device to scramble the random access preamble by using the method 1 or the method 2.

In an optional method, a parameter index may have different values corresponding to the method 1 and/or the method 2. For example, when a value of the parameter index is 0, it indicates that the terminal device scrambles the random access preamble by using the method 1. When a value of the parameter index is 1, it indicates that the terminal device scrambles the random access preamble by using the method 2.

In an optional method, when the terminal device receives the scrambling code indication information sent by the network device, the terminal device scrambles the random access preamble by using the method 1. When the terminal device does not receive the scrambling code indication information sent by the network device, the terminal device scrambles the random access preamble by using the method 2.

In an optional method, the scrambling code indication information includes two states: a first state and a second state. When the scrambling code indication information indicates the first state, the terminal device scrambles the random access preamble by using the method 1. When the scrambling code indication information indicates the second state, the terminal device scrambles the random access preamble by using the method 2.

The base sequence or the scrambling code sequence may be an orthogonal sequence, a ZC sequence, a pseudo-random sequence, a differential orthogonal sequence, an orthogonal sequence obtained after an added scrambling code is differentiated on a symbol group in each repetition period, a subset of an orthogonal sequence obtained after an added scrambling code is differentiated on a symbol group in each repetition period, or the like. The orthogonal sequence may be a Walsh sequence. The pseudo-random sequence may be an m-sequence, an M-sequence a Gold sequence, or the like. An initialization seed of the pseudo-random sequence is a function of at least one of a cell identifier, a hyper frame number, a frame number, a symbol index, a symbol group index, a repetition quantity, a sub-carrier index, a carrier index, or the like. Preferably, the base sequence or the scrambling code sequence may be expressed by a formula $c(m)=e^{j2u m\pi/k}$, where m=0, 1, 2, ..., or k−1, and u is an index of a scrambling code sequence $u=N_{ID}^{Ncell}$ mod k or $u=N_{ID}^{Ncell}$ mod(k−1), where $N_{ID}^{Ncell}$ is a cell identifier, and k is a length of the scrambling code sequence.

In a possible implementation, the first interval is 1.2.5 kHz.

In a possible implementation, the second interval is 3.75 kHz.

In a possible implementation, the third interval is 22.5 kHz.

It should be understood that values of the first interval, the second interval, and the third interval are not specifically limited in this application. The foregoing embodiment is merely an example for description, and shall not constitute any limitation on this application. For example, the first interval may alternatively be 2.5 kHz, and the second interval may alternatively be 1.25 kHz. For another example, the third interval may be 12.5 kHz.

Further, a frequency hopping direction from the first symbol group to the second symbol group is opposite to a frequency hopping direction from the fifth symbol group to the sixth symbol group, and a frequency hopping direction from the second symbol group to the third symbol group is opposite to a frequency hopping direction from the fourth symbol group to the fifth symbol group.

Optionally, the frequency hopping direction from the first symbol group to the second symbol group is the same as the frequency hopping direction from the second symbol group to the third symbol group. Alternatively, the frequency hopping direction from the first symbol group to the second symbol group is different from the frequency hopping direction from the second symbol group to the third symbol group.

In this embodiment of this application, the six symbol groups of the random access preamble may be classified into two groups, and each group includes three symbol groups. A frequency hopping interval between a first symbol group and a second symbol group in a first group and a frequency hopping interval between a first symbol group and a second symbol group in a second group are equal and both are first intervals. A frequency hopping interval between the second symbol group and a third symbol group in the first group and a frequency hopping interval between the second symbol group and a third symbol group in the second group are equal and both are second intervals. A frequency hopping interval between the third symbol group in the first group and the first symbol group in the second group is a third interval.

Optionally, a frequency hopping direction from the first symbol group to the second symbol group in the first group is opposite to a frequency hopping direction from the first symbol group to the second symbol group in the second group. A frequency hopping direction from the second symbol group to the third symbol group in the first group is opposite to a frequency hopping direction from the second symbol group to the third symbol group in the second group. Alternatively, frequency hopping directions among three symbol groups in the first group are opposite to frequency hopping directions among three symbol groups in the second group.

Through simulation, it can be learned that when the random access preamble is sent in the foregoing frequency hopping direction based on the first interval of 1.25 kHz, the second interval of 3.75 kHz, and the third interval of 22.5 kHz, accuracy of estimated uplink timing can be improved.

In a possible implementation, the random access configuration information includes a quantity W of repetitions of the random access preamble, 6*W symbol groups included in the random access preamble in the W repetitions are numbered 0, 1, ..., i, ..., 6W−2, and 6W−1 in a time sequence, W is a positive integer, and the preset rule includes a first formula and a second formula; and the determining, by the terminal device, a frequency location of the random access preamble based on random access configuration information and a preset rule includes:

determining, by the terminal device based on the random access configuration information, a frequency location of a symbol group whose number is 0, determining a frequency location of a symbol group P based on the first formula and a number i of the symbol group P, and determining a frequency location of a symbol group Q based on the second formula and a number i of the symbol group Q, where the symbol group P is a symbol group whose number satisfies i>0 and imod6=0 in the 6*W symbol groups, the symbol group Q is a symbol group whose number satisfies i>0 and imod6≠0 in the 6*W symbol groups, and mod represents a modulo operation.

Specifically, the terminal device determines the frequency location of the symbol group whose number is 0 based on the random access configuration information, determines the frequency location of the symbol group P based on the first formula and the number i of the symbol group P, and determines the frequency location of the symbol group Q based on the second formula and the number i of the symbol group Q.

The preset rule may be, for example, specified in a protocol, or may be configured by the network device. This is not limited in this embodiment of this application.

In a possible implementation, the first formula is related to the frequency location of the symbol group whose number is 0 and a function determined based on a number i and a pseudo-random sequence, or the first formula is related to a frequency location of a symbol group whose number is i−6 and a function determined based on a number i and a pseudo-random sequence; and the number i is a number of the symbol group P.

It can be learned that the frequency location of the symbol group P is related to the frequency location of the symbol group whose number is 0, or is related to a frequency location of a sixth symbol group before the symbol group P, and is irrelevant to a frequency location of another symbol group.

In a possible implementation, the second formula is related to a frequency location of a symbol group whose number is i−1 and a frequency location interval and a frequency hopping direction of a symbol group whose number is i relative to the symbol group whose number is i−1; and the number i is a number of the symbol group Q.

It can be learned that the frequency location of the symbol group Q is related only to a frequency location of a previous symbol group adjacent to the symbol group Q, and is irrelevant to a frequency location of another symbol group.

It should be understood that the frequency location interval is an absolute value of a difference between subcarrier indexes.

In a possible implementation, the preset rule includes a formula 1 or a formula 2;

the formula 1 is:

$$\tilde{n}_{sc}^{RA}(i) = \begin{cases} (\tilde{n}_{sc}^{RA}(0) + f(i/6)) \bmod N_{sc}^{RA} & i \bmod 6 = 0 \text{ and } i > 0 \\ \tilde{n}_{sc}^{RA}(i-1) + 1 & \begin{array}{l} i \bmod 6 = 1, 5 \text{ and} \\ \tilde{n}_{sc}^{RA}(i-1) \bmod 2 = 0 \end{array} \\ \tilde{n}_{sc}^{RA}(i-1) - 1 & \begin{array}{l} i \bmod 6 = 1, 5 \text{ and} \\ \tilde{n}_{sc}^{RA}(i-1) \bmod 2 = 1 \end{array} \\ \tilde{n}_{sc}^{RA}(i-1) + 3 & \begin{array}{l} i \bmod 6 = 2, 4 \text{ and} \\ \lfloor \tilde{n}_{sc}^{RA}(i-1)/3 \rfloor \bmod 2 = 0 \end{array} \\ \tilde{n}_{sc}^{RA}(i-1) - 3 & \begin{array}{l} i \bmod 6 = 2, 4 \text{ and} \\ \lfloor \tilde{n}_{sc}^{RA}(i-1)/3 \rfloor \bmod 2 = 1 \end{array} \\ \tilde{n}_{sc}^{RA}(i-1) + 18 & i \bmod 6 = 3 \text{ and } \tilde{n}_{sc}^{RA}(i-1) < 18 \\ \tilde{n}_{sc}^{RA}(i-1) - 18 & i \bmod 6 = 3 \text{ and } \tilde{n}_{sc}^{RA}(i-1) \geq 18 \end{cases} ;$$

and
the formula 2 is:

$$\tilde{n}_{sc}^{RA}(i) = \begin{cases} (\tilde{n}_{sc}^{RA}(i-6) + f(i/6)) \bmod N_{sc}^{RA} & i \bmod 6 = 0 \text{ and } i > 0 \\ \tilde{n}_{sc}^{RA}(i-1) + 1 & \begin{array}{l} i \bmod 6 = 1, 5 \text{ and} \\ \tilde{n}_{sc}^{RA}(i-1) \bmod 2 = 0 \end{array} \\ \tilde{n}_{sc}^{RA}(i-1) - 1 & \begin{array}{l} i \bmod 6 = 1, 5 \text{ and} \\ \tilde{n}_{sc}^{RA}(i-1) \bmod 2 = 1 \end{array} \\ \tilde{n}_{sc}^{RA}(i-1) + 3 & \begin{array}{l} i \bmod 6 = 2, 4 \text{ and} \\ \lfloor \tilde{n}_{sc}^{RA}(i-1)/3 \rfloor \bmod 2 = 0 \end{array} \\ \tilde{n}_{sc}^{RA}(i-1) - 3 & \begin{array}{l} i \bmod 6 = 2, 4 \text{ and} \\ \lfloor \tilde{n}_{sc}^{RA}(i-1)/3 \rfloor \bmod 2 = 1 \end{array} \\ \tilde{n}_{sc}^{RA}(i-1) + 18 & i \bmod 6 = 3 \text{ and } \tilde{n}_{sc}^{RA}(i-1) < 18 \\ \tilde{n}_{sc}^{RA}(i-1) - 18 & i \bmod 6 = 3 \text{ and } \tilde{n}_{sc}^{RA}(i-1) \geq 18 \end{cases} ;$$

where $\tilde{n}_{sc}^{RA}(i)$ is a frequency location of the symbol group whose number is i, $f(i/6)$ is a function determined based on the number i of the symbol group, $N_{sc}^{RA}$, and a pseudo-random sequence, $N_{sc}^{RA}$ is a transmission limitation on a random access preamble, $\lfloor \ \rfloor$ represents rounding down, $N_{sc}^{RA} > 0$, and $\tilde{n}_{sc}^{RA}(i) \geq 0$.

Herein, $N_{sc}^{RA}$ may be specified in a protocol, may be notified by the network device to the terminal device, may be a fixed value, or may be one of some candidate values. For example, the network device may use the random access configuration information to carry $N_{sc}^{RA}$. When the subcarrier bandwidth is 1.25 kHz, $N_{sc}^{RA}$ may be equal to 36. This is not limited herein. For example, $N_{sc}^{RA}$ may alternatively be 72. A value of $N_{sc}^{RA}$ may be equal to $N_{sc}^{NPRACH}$ or a value of $N_{sc}^{RA}$ may be associated with or bound to $N_{sc}^{NPRACH}$. For example, $N_{sc}^{RA}$ is associated with $N_{sc}^{NPRACH}$ by using some correspondences in a table. This is not limited herein. $N_{sc}^{NPRACH}$ is a parameter in the random access configuration information sent by the network device to the terminal device, and represents a quantity of subcarriers used for random access.

Optionally, the frequency location of the symbol group whose number is 0 is $\tilde{n}_{sc}^{RA}(0) = n_{init} \bmod N_{sc}^{RA}$, where $n_{init}$ is an index of a subcarrier selected from $\{0, 1, \ldots, N_{sc}^{NPRACH}-1\}$ at a media access control (MAC) layer, and $N_{sc}^{NPRACH}$ represents a quantity of subcarriers used for random access.

When the frequency location $\tilde{n}_{sc}^{RA}(i)$ is a relative frequency location, to be specific, when $\tilde{n}_{sc}^{RA}(i)$ is a relative frequency location of an $i^{th}$ symbol group, an absolute frequency location of the $i^{th}$ symbol group is denoted as $N_{sc}^{RA}(i)$. In this case, $N_{sc}^{RA}(i) = n_{start} + \tilde{n}_{sc}^{RA}(i)$, where $n_{start}$ is an offset frequency location. It can be learned from the expression that the absolute frequency location of the $i^{th}$ symbol group may be determined based on the frequency location of the $i^{th}$ symbol group and the offset frequency location that are determined by the terminal device.

For example, the offset frequency location $n_{start}$ satisfies $n_{start} = N_{scoffset}^{NPRACH} + \lfloor n_{init}/N_{sc}^{RA} \rfloor * N_{sc}^{RA}$, where $n_{init}$ is an index of a subcarrier selected from $\{0, 1, \ldots, N_{sc}^{NPRACH}-1\}$ at a MAC layer, $N_{scoffset}^{NPRACH}$ and $N_{sc}^{NPRACH}$ are two parameters in the random access configuration information, $N_{scoffset}^{NPRACH}$ represents a frequency location of a common start subcarrier of an NPRACH, and $N_{sc}^{NPRACH}$ represents a quantity of subcarriers used for random access.

Optionally, a value of $f(i/6)$ may be determined based on a function $f(t)$ of a pseudo-random sequence $c(n)$. $f(t)$ may be expressed as $$f(t) = \left(f(t-1) + \left(\sum_{n=10t+1}^{10t+9} c(n)2^{n-(10t+1)}\right) \bmod(N_{sc}^{RA}-1) + 1\right) \bmod N_{sc}^{RA},$$

where $f(-1) = 0$, and $c(n)$ may be an m-sequence, an M-sequence, a Gold sequence, or the like.

Further, an initialization seed of $c(n)$ may be a physical-layer cell identifier of the terminal device, or a function of a physical-layer cell identifier.

According to a second aspect, a communication method is provided. The method includes: determining, by a network device, random access configuration information, and sending the random access configuration information to a terminal device, where the random access configuration information is used to indicate the terminal device to determine a random access preamble, the random access preamble includes six symbol groups, and the six symbol groups include a first symbol group, a second symbol group, a third symbol group, a fourth symbol group, a fifth symbol group, and a sixth symbol group; and receiving, by the network device, the random access preamble that is sent by the terminal device based on the random access configuration information, where the random access preamble is sent by the terminal device based on a determined frequency location, the frequency location is determined based on the random access configuration information and a preset rule, a frequency interval between every two adjacent symbol groups in the six symbol groups is a frequency hopping interval, a frequency hopping interval between the first symbol group and the second symbol group and a frequency hopping interval between the fifth symbol group and the sixth symbol group are equal and both are first intervals, a frequency hopping interval between the second symbol group and the third symbol group and a frequency hopping interval between the fourth symbol group and the fifth symbol group are equal and both are second intervals, a frequency hopping interval between the third symbol group and the fourth symbol group is a third interval, and the first interval, the second interval, and the third interval are unequal and are not equal to zero.

Therefore, according to the communication method in this embodiment of this application, the terminal device determines a frequency hopping pattern (namely, a frequency location of each symbol group) of the random access preamble including the six symbol groups, to send the random access preamble and perform random access.

In a possible implementation, the first interval is 1.25 kHz, the second interval is 3.75 kHz, and the third interval is 22.5 kHz.

In a possible implementation, a frequency hopping direction from the first symbol group to the second symbol group is opposite to a frequency hopping direction from the fifth symbol group to the sixth symbol group, and a frequency hopping direction from the second symbol group to the third symbol group is opposite to a frequency hopping direction from the fourth symbol group to the fifth symbol group.

In a possible implementation, the random access configuration information includes a quantity W of repetitions of the random access preamble, 6*W symbol groups included in the random access preamble in the W repetitions are numbered 0, 1, . . . , i, . . . , 6W−2, and 6W−1 in a time sequence, W is a positive integer, and the preset rule includes a first formula and a second formula; and the determining, by the terminal device, a frequency location of the random access preamble based on random access configuration information and a preset rule includes:

determining, by the terminal device based on the random access configuration information, a frequency location of a symbol group whose number is 0, determining a frequency location of a symbol group P based on the first formula and a number i of the symbol group P, and determining a frequency location of a symbol group Q based on the second formula and a number i of the symbol group Q, where the symbol group P is a symbol group whose number satisfies i>0 and imod6=0 in the 6*W symbol groups, the symbol group Q is a symbol group whose number satisfies i>0 and imod6≠0 in the 6*W symbol groups, and mod represents a modulo operation.

In a possible implementation, the first formula is related to the frequency location of the symbol group whose number is 0 and a function determined based on a number i and a pseudo-random sequence, or the first formula is related to a frequency location of a symbol group whose number is i−6 and a function determined based on a number i and a pseudo-random sequence; and the number i is a number of the symbol group P.

In a possible implementation, the second formula is related to a frequency location of a symbol group whose number is i−1 and a frequency location interval and a frequency hopping direction of a symbol group whose number is i relative to the symbol group whose number is i−1; and the number i is a number of the symbol group Q.

In a possible implementation, the preset rule includes a formula 1 or a formula 2;
the formula 1 is:

$$\tilde{n}_{sc}^{RA}(i) = \begin{cases} (\tilde{n}_{sc}^{RA}(0) + f(i/6)) \bmod N_{sc}^{RA} & i \bmod 6 = 0 \text{ and } i > 0 \\ \tilde{n}_{sc}^{RA}(i-1) + 1 & i \bmod 6 = 1, 5 \text{ and } \tilde{n}_{sc}^{RA}(i-1) \bmod 2 = 0 \\ \tilde{n}_{sc}^{RA}(i-1) - 1 & i \bmod 6 = 1, 5 \text{ and } \tilde{n}_{sc}^{RA}(i-1) \bmod 2 = 1 \\ \tilde{n}_{sc}^{RA}(i-1) + 3 & i \bmod 6 = 2, 4 \text{ and } \lfloor \tilde{n}_{sc}^{RA}(i-1)/3 \rfloor \bmod 2 = 0 \\ \tilde{n}_{sc}^{RA}(i-1) - 3 & i \bmod 6 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i \bmod 6 = 3 \text{ and } \tilde{n}_{sc}^{RA}(i-1) < 18 \\ \tilde{n}_{sc}^{RA}(i-1) - 18 & i \bmod 6 = 3 \text{ and } \tilde{n}_{sc}^{RA}(i-1) \geq 18 \end{cases} ;$$

and
the formula 2 is:

$$\tilde{n}_{sc}^{RA}(i) = \begin{cases} (\tilde{n}_{sc}^{RA}(i-6) + f(i/6)) \bmod N_{sc}^{RA} & i \bmod 6 = 0 \text{ and } i > 0 \\ \tilde{n}_{sc}^{RA}(i-1) + 1 & i \bmod 6 = 1, 5 \text{ and } \tilde{n}_{sc}^{RA}(i-1) \bmod 2 = 0 \\ \tilde{n}_{sc}^{RA}(i-1) - 1 & i \bmod 6 = 1, 5 \text{ and } \tilde{n}_{sc}^{RA}(i-1) \bmod 2 = 1 \\ \tilde{n}_{sc}^{RA}(i-1) + 3 & i \bmod 6 = 2, 4 \text{ and } \lfloor \tilde{n}_{sc}^{RA}(i-1)/3 \rfloor \bmod 2 = 0 \\ \tilde{n}_{sc}^{RA}(i-1) - 3 & i \bmod 6 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i \bmod 6 = 3 \text{ and } \tilde{n}_{sc}^{RA}(i-1) < 18 \\ \tilde{n}_{sc}^{RA}(i-1) - 18 & i \bmod 6 = 3 \text{ and } \tilde{n}_{sc}^{RA}(i-1) \geq 18 \end{cases} ;$$

where $\tilde{n}_{sc}^{RA}(i)$ is a frequency location of the symbol group whose number is i, $f(i/6)$ is a function determined based on the number i of the symbol group, $N_{sc}^{RA}$, and a pseudo-random sequence, $N_{sc}^{RA}$ is a transmission limitation on a random access preamble, $\lfloor \; \rfloor$ represents rounding down, $N_{sc}^{RA}>0$, and $\tilde{n}_{sc}^{RA}(i) \geq 0$.

For the second aspect, refer to related descriptions of the first aspect. Details are not described herein again.

According to a third aspect, a communication method is provided. The method includes: determining, by a terminal device, a random access preamble, where the random access preamble includes five symbol groups, and the five symbol groups include a first symbol group, a second symbol group, a third symbol group, a fourth symbol group, and a fifth symbol group;

determining, by the terminal device, a frequency location of the random access preamble based on random access configuration information and a preset rule, where a frequency hopping interval between the second symbol group and the third symbol group and a frequency hopping interval between the fourth symbol group and the fifth symbol group are equal and both are first intervals, a frequency hopping interval between the first symbol group and the second symbol group is a second interval, a frequency hopping interval between the third symbol group and the fourth symbol group is a third interval, and the first interval, the second interval, and the third interval are unequal and are not equal to zero; and sending, by the terminal device, the random access preamble to a network device based on the frequency location.

Therefore, according to the communication method in this embodiment of this application, the terminal device determines a frequency hopping pattern (namely, a frequency location of each symbol group) of the random access preamble including the five symbol groups, to send the random access preamble and perform random access.

It should be understood that a frequency hopping interval is a frequency interval between two adjacent symbol groups in time domain, or the frequency hopping interval is an absolute value of a frequency difference between the two adjacent symbol groups in time domain.

It should be further understood that the frequency location in this application indicates an index or a number of a subcarrier. The frequency location may be a relative frequency location or an absolute frequency location. A relative frequency location of a symbol group is a difference between an absolute frequency location and an offset frequency location of the symbol group. Correspondingly, the absolute frequency location of the symbol group is a sum of the relative frequency location and the offset frequency location of the symbol group. It should be understood that the terminal device sends the random access preamble on a frequency corresponding to the absolute frequency location of the symbol group.

Optionally, the frequency hopping interval may be an integer multiple of a subcarrier bandwidth. For example, if the subcarrier bandwidth is 1.25 kHz, the frequency hopping interval between the adjacent symbol groups may be 1.25 kHz, where N is a positive integer. Alternatively, the frequency hopping interval between the adjacent symbol groups may not be the integer multiple of the subcarrier bandwidth. Whether the frequency hopping interval between the adjacent symbol groups is the integer multiple of the subcarrier bandwidth is not limited in this application.

Optionally, a frequency hopping range of the random access preamble is 36 subcarriers.

An existing random access preamble may be used for frequency hopping in 12 subcarriers (namely, 45 kHz). When a subcarrier bandwidth is reduced from 3.75 kHz to 1.25 kHz in this embodiment of this application, on a basis that an NPRACH resource of 45 kHz is maintained, the frequency hopping range of the random access preamble in this application may be increased from 12 subcarriers to 36 subcarriers. Therefore, a frequency hopping solution provided in this application can support more users in reusing the NPRACH resource to perform the random access. In other words, compared with an existing solution with 45 kHz supporting 12 users, this application can support reuse by 36 users.

Optionally, any one of the five symbol groups included in the random access preamble may include one cyclic prefix (CP) and one symbol, one CP and two symbols, or one CP and three symbols. Time lengths of both the CP and the symbol herein may be 800 microseconds (μs).

A maximum cell radius is related to a guard time (GT). A longer guard time indicates a larger covered maximum cell radius. The guard time is related to the CP and a total length of symbols in the symbol group. In addition, the time length of the CP should cover the maximum cell radius. According to a formula S=V*T, V is a speed of light of 3.0*10$^8$ m/s, and S=2*100*10$^3$ m. Therefore, T=666.7 μs may be obtained by substituting the two values into the formula S=V*T However, the time length $T_{CP}$ of the CP is 800 μs, and is greater than 666.7 μs. Therefore, in this application, a format of the random access preamble is set, so that the random access preamble can support the larger cell radius, which is approximately 100 km.

Further, a sequence carried on each symbol in the symbol group may be the same. For example, the sequence carried on each symbol is a, and sequences that may be carried on E symbols are $$\underbrace{a, a, \cdots a,}_{E}$$

where a may be a real number, for example, 1 or −1, or a may be a complex number, for example, j or −j, and j represents an imaginary unit, and satisfies j$^2$=−1. Sequences carried on the symbols in the symbol group may be different, or sequences carried on some symbols in the symbol group may be the same, and sequences carried on the other symbols may be different.

In addition, sequences carried in any two symbol groups may be the same, or may be different. This is not limited in this embodiment of this application.

The random access preamble in this application may be a random access preamble that is not scrambled by using a scrambling sequence, or may be a random access preamble that is scrambled by using a scrambling sequence. Scrambling is performed to improve interference randomization performance and avoid a false alarm caused by inter-cell interference.

A length of a scrambling code sequence obtained by the terminal device based on a base sequence may have a plurality of cases. Specifically, the length of the scrambling code sequence may be the same as the quantities of symbols in a symbol group of the random access preamble, the length of the scrambling code sequence may be the same as the quantities of symbols in a repetition period of the random access preamble, or the length of the scrambling code sequence may be the same as the quantities of symbols in all repetition periods of the random access preamble. The length of the scrambling code sequence may be the same as a sum of a cyclic prefix and the quantity of symbols in the symbol group of the random access preamble, the length of the scrambling code sequence may be the same as a sum of a cyclic prefix and the quantity of symbols in the repetition period of the random access preamble, or the length of the scrambling code sequence may be the same as a sum of cyclic prefixes and the quantity of symbols in all the repetition periods of the random access preamble. The length of the scrambling code sequence is not limited in this application.

The terminal device may generate the base sequence in a manner that is set inside the terminal device, or obtain the base sequence through query. There may be a plurality of methods for the terminal device to obtain the scrambling code sequence based on the base sequence. In an optional method 1, the scrambling sequence is the base sequence, and the scrambling sequence and the base sequence are equal. For example, the base sequence is ABC, and the obtained scrambling code sequence is ABC. In an optional method 2, each element in the base sequence is sequentially repeated for M times to obtain the scrambling code sequence. To be specific, the terminal device repeats a first element in the base sequence for M times, repeats a second element for M times, . . . , and repeats a last element for M times. For example, the base sequence is ABC, each element in the base sequence is sequentially repeated twice to obtain AABBCC. For example, the base sequence is AB, and each element in the base sequence is sequentially repeated three times to obtain AAABBB.

The terminal device may obtain scrambling code indication information sent by the network device. The scrambling code indication information is used to indicate the terminal device to scramble the random access preamble by using the method 1 or the method 2.

In an optional method, the parameter index may have different values corresponding to the method 1 and/or the method 2. For example, when a value of the parameter index is 0, it indicates that the terminal device scrambles the random access preamble by using the method 1. When a value of the parameter index is 1, it indicates that the terminal device scrambles the random access preamble by using the method 2.

In an optional method, when the terminal device receives the scrambling code indication information sent by the network device, the terminal device scrambles the random access preamble by using the method 1. When the terminal device does not receive the scrambling code indication information sent by the network device, the terminal device scrambles the random access preamble by using the method 2.

In an optional method, the scrambling code indication information includes two states: a first state and a second state. When the scrambling code indication information indicates the first state, the terminal device scrambles the random access preamble by using the method 1. When the scrambling code indication information indicates the second state, the terminal device scrambles the random access preamble by using the method 2.

The base sequence or the scrambling code sequence may be an orthogonal sequence, a ZC sequence, a pseudo-random sequence, a differential orthogonal sequence, an orthogonal sequence obtained after an added scrambling code is differentiated on a symbol group in each repetition period, a subset of an orthogonal sequence obtained after an added scrambling code is differentiated on a symbol group in each repetition period, or the like. The orthogonal sequence may be a Walsh sequence. The pseudo-random sequence may be an m-sequence, an M-sequence, a Gold sequence, or the like. An initialization seed of the pseudo-random sequence is a function of at least one of a cell identifier, a hyper frame number, a frame number, a symbol index, a symbol group index, a repetition quantity, a subcarrier index, a carrier index, or the like. Preferably, the base sequence or the scrambling code sequence may be expressed by a formula $c(m)=e^{j2um\pi/k}$, where m=0, 1, 2, . . . , or k−1, and u is an index of a scrambling code sequence $u=N_{ID}^{Ncell}$ mod k or $u=N_{ID}^{Ncell}$ mod(k−1), where $N_{ID}^{Ncell}$ is a cell identifier, and k is a length of the scrambling code sequence.

Optionally, the second interval may be 1.25 kHz.
Optionally, the first interval may be 3.75 kHz.
Optionally, the third interval may be 22.5 kHz.

In a possible implementation, a frequency hopping direction from the second symbol group to the third symbol group is opposite to a frequency hopping direction from the fourth symbol group to the fifth symbol group.

Through simulation, it can be learned that when the random access preamble is sent in the foregoing frequency hopping direction based on the second interval of 1.25 kHz, the first interval of 3.75 kHz, and the third interval of 22.5 kHz, accuracy of estimated uplink timing can be improved.

In a possible implementation, the random access configuration information includes a quantity W of repetitions of the random access preamble, 5*W symbol groups included in the W repetitions of the random access preamble are numbered 0, 1, . . . , i, . . . , 5W−2, and 5W−1 in a time sequence. W is a positive integer, and the preset rule includes a first formula and a second formula; and the determining, by the terminal device, a frequency location of the random access preamble based on random access configuration information and a preset rule includes:

determining, by the terminal device based on the random access configuration information, a frequency location of a symbol group whose number is 0, determining a frequency location of a symbol group P based on the first formula and a number i of the symbol group P, and determining a frequency location of a symbol group Q based on the second formula and a number i of the symbol group Q, where the symbol group P is a symbol group whose number satisfies i>0 and imod5=0 in the 5*W symbol groups, the symbol group Q is a symbol group whose number satisfies i>0 and imod5≠0 in the 5*W symbol groups, and mod represents a modulo operation.

Specifically, the terminal device determines the frequency location of the symbol group whose number is 0 based on the random access configuration information, determines the frequency location of the symbol group P based on the first formula and the number i of the symbol group P, and determines the frequency location of the symbol group Q based on the second formula and the number i of the symbol group Q.

The preset rule may be, for example, specified in a protocol, or may be configured by the network device. This is not limited in this embodiment of this application.

In a possible implementation, the first formula is related to the frequency location of the symbol group whose number is 0 and a function determined based on a number i and a pseudo-random sequence, or the first formula is related to a frequency location of a symbol group whose number is i−5 and a function determined based on the number i and a pseudo-random sequence, and the number i is a number of the symbol group P.

It can be learned that the frequency location of the symbol group P is related to the frequency location of the symbol group whose number is 0, or is related to a frequency location of a fifth symbol group before the symbol group P, and is irrelevant to a frequency location of another symbol group.

In a possible implementation, the second formula is related to a frequency location of a symbol group whose number is i−1 and a frequency location interval and a frequency hopping direction of a symbol group whose number is i relative to the symbol group whose number is i−1; and the number i is a number of the symbol group Q.

It can be learned that the frequency of the symbol group Q is related only to a frequency location of a previous symbol group adjacent to the symbol group Q, and is irrelevant to a frequency location of another symbol group.

It should be understood that the frequency location interval is an absolute value of a difference between subcarrier indexes.

In a possible implementation, the preset rule includes a formula 3 or a formula 4;

the formula 3 is:

$$\tilde{n}_{sc}^{RA}(i) = \begin{cases} (\tilde{n}_{sc}^{RA}(0) + f(i/5)) \bmod N_{sc}^{RA} & i \bmod 5 = 0 \text{ and } i > 0 \\ \tilde{n}_{sc}^{RA}(i-1) + 1 & i \bmod 5 = 1 \text{ and } \tilde{n}_{sc}^{RA}(i-1) \bmod 2 = 0 \\ \tilde{n}_{sc}^{RA}(i-1) - 1 & i \bmod 5 = 1 \text{ and } \tilde{n}_{sc}^{RA}(i-1) \bmod 2 = 1 \\ \tilde{n}_{sc}^{RA}(i-1) + 3 & i \bmod 5 = 2, 4 \text{ and } \lfloor \tilde{n}_{sc}^{RA}(i-1)/3 \rfloor \bmod 2 = 0 \\ \tilde{n}_{sc}^{RA}(i-1) - 3 & i \bmod 5 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i \bmod 5 = 3 \text{ and } \tilde{n}_{sc}^{RA}(i-1) < 18 \\ \tilde{n}_{sc}^{RA}(i-1) - 18 & i \bmod 5 = 3 \text{ and } \tilde{n}_{sc}^{RA}(i-1) \geq 18 \end{cases}$$

and
the formula 4 is:

$$\tilde{n}_{sc}^{RA}(i) = \begin{cases} (\tilde{n}_{sc}^{RA}(i-5) + f(i/5)) \bmod N_{sc}^{RA} & i \bmod 5 = 0 \text{ and } i > 0 \\ \tilde{n}_{sc}^{RA}(i-1) + 1 & i \bmod 5 = 1 \text{ and } \tilde{n}_{sc}^{RA}(i-1) \bmod 2 = 0 \\ \tilde{n}_{sc}^{RA}(i-1) - 1 & i \bmod 5 = 1 \text{ and } \tilde{n}_{sc}^{RA}(i-1) \bmod 2 = 1 \\ \tilde{n}_{sc}^{RA}(i-1) + 3 & i \bmod 5 = 2, 4 \text{ and } \lfloor \tilde{n}_{sc}^{RA}(i-1)/3 \rfloor \bmod 2 = 0 \\ \tilde{n}_{sc}^{RA}(i-1) - 3 & i \bmod 5 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i \bmod 5 = 3 \text{ and } \tilde{n}_{sc}^{RA}(i-1) < 18 \\ \tilde{n}_{sc}^{RA}(i-1) - 18 & i \bmod 5 = 3 \text{ and } \tilde{n}_{sc}^{RA}(i-1) \geq 18 \end{cases}$$

where $\tilde{n}_{sc}^{RA}(i)$ is a frequency location of the symbol group whose number is i, $f(i/5)$ is a function determined based on the number i of the symbol group, $N_{sc}^{RA}$, and a pseudo-random sequence, $N_{sc}^{RA}$ is a transmission limitation on a random access preamble, $\lfloor \ \rfloor$ represents rounding down, $N_{sc}^{RA} > 0$, and $\tilde{n}_{sc}^{RA}(i) \geq 0$.

Herein, $N_{sc}^{RA}$ may be specified in a protocol, may be notified by the network device to the terminal device, may be a fixed value, or may be one of some candidate values. For example, the network device may use the random access configuration information to carry $N_{sc}^{RA}$. When the subcarrier bandwidth is 1.25 kHz, $N_{sc}^{RA}$ may be equal to 36. This is not limited herein. For example, $N_{sc}^{RA}$ may alternatively be 72. A value of $N_{sc}^{RA}$ may be equal to $N_{sc}^{NPRACH}$, or a value of $N_{sc}^{RA}$ may be associated with or bound to $N_{sc}^{NPRACH}$. For example, $N_{sc}^{RA}$ is associated with $N_{sc}^{NPRACH}$ by using some correspondences in a table. This is not limited herein. $N_{sc}^{NPRACH}$ is a parameter in the random access configuration information sent by the network device to the terminal device, and represents a quantity of subcarriers used for random access.

Optionally, the frequency location of the symbol group whose number is 0 is $\tilde{n}_{sc}^{RA}(0) = n_{init} \bmod N_{sc}^{RA}$, where $n_{init}$ is an index of a subcarrier selected from $\{0, 1, \ldots, N_{sc}^{NPRACH} - 1\}$ at a media access control (MAC) layer, and $N_{sc}^{NPRACH}$ represents a quantity of subcarriers used for random access.

When the frequency location $\tilde{n}_{sc}^{RA}(i)$ is a relative frequency location, to be specific, when $\tilde{n}_{sc}^{RA}(i)$ is a relative frequency location of an $i^{th}$ symbol group, an absolute frequency location of the $i^{th}$ symbol group is denoted as $N_{sc}^{RA}(i)$. In this case, $N_{sc}^{RA}(i) = n_{start} + \tilde{n}_{sc}^{RA}(i)$, where $n_{start}$ is an offset frequency location, it can be learned from the expression that the absolute frequency location of the $i^{th}$ symbol group may be determined based on the frequency location of the $i^{th}$ symbol group and the offset frequency location that are determined by the terminal device.

For example, the offset frequency location $n_{start}$ satisfies $n_{start} = N_{scoffset}^{NPRACH} + \lfloor n_{init}/N_{sc}^{RA} \rfloor * N_{sc}^{RA}$, where $n_{init}$ an index of a subcarrier selected from $\{0, 1, \ldots, N_{sc}^{NPRACH} - 1\}$ at is MAC layer, and $N_{scoffset}^{NPRACH}$ and $N_{sc}^{NPRACH}$ are two parameters in the random access configuration information, $N_{scoffset}^{NPRACH}$ represents a frequency location of a common start subcarrier of an NPRACH, and $N_{sc}^{NPRACH}$ represents a quantity of subcarriers used for random access.

Optionally, a value of $f(i/5)$ may be determined based on a function $f(t)$ of a pseudo-random sequence $c(n)$. $f(t)$ may be expressed as $$f(t) = \left(f(t-1) + \left(\sum_{n=10t+1}^{10t+9} c(n)2^{n-(10t+1)}\right) \bmod(N_{sc}^{RA} - 1) + 1\right) \bmod N_{sc}^{RA},$$

where $f(-1)=0$, and $c(n)$ may be an m-sequence, all M-sequence, a Gold sequence, or the like.

Further, an initialization seed of $c(n)$ may be a physical-layer cell identifier of the terminal device, or a function of a physical-layer cell identifier.

According to a fourth aspect, a communication method is provided. The method includes: determining, by a network device, random access configuration information, and sending the random access configuration information to a terminal device, where the random access configuration information is used to indicate the terminal device to determine a random access preamble, the random access preamble includes five symbol groups, and the five symbol groups include a first symbol group, a second symbol group, a third symbol group, a fourth symbol group, and a fifth symbol group; and receiving, by the network device, the random access preamble that is sent by the terminal device based on the random access configuration information, where the random access preamble is sent by the terminal device based on a determined frequency location, the frequency location is determined based on the random access configuration information and a preset rule, a frequency hopping interval between the second symbol group and the third symbol group and a frequency hopping interval between the fourth symbol group and the fifth symbol group are equal and both are first intervals, a frequency hopping interval between the first symbol group and the second symbol group is a second interval, a frequency hopping interval between the third symbol group and the fourth symbol group is a third interval, and the first interval, the second interval, and the third interval are unequal and are not equal to zero.

Therefore, according to the communication method in this embodiment of this application, the terminal device determines a frequency hopping pattern (namely, a frequency location of each symbol group) of the random access preamble including the five symbol groups, to send the random access preamble and perform random access.

Optionally, the second interval may be 1.25 kHz.
Optionally, the first interval may be 3.75 kHz.
Optionally, the third interval may be 22.5 kHz.

In a possible implementation, a frequency hopping direction from the second symbol group to the third symbol group is opposite to a frequency hopping direction from the fourth symbol group to the fifth symbol group.

In a possible implementation, the random access configuration information includes a quantity W of repetitions of the random access preamble, 5*W symbol groups included in the W repetitions of the random access preamble are numbered 0, 1, ..., i, ..., 5W−2, and 5W−1 in a time sequence, W is a positive integer, and the random access configuration information is further used to determine a frequency location of a symbol group whose number is 0; and the preset rule includes a first formula and a second formula, the first formula and a number i of a symbol group P are used to determine a frequency location of the symbol group P, the second formula and a number i of a symbol group Q are used to determine a frequency location of the symbol group Q, the symbol group P is a symbol group whose number satisfies i>0 and imod5=0 in the 5*W symbol groups, the symbol group Q is a symbol group whose number satisfies i>0 and imod5≠0 in the 5*W symbol groups, and mod represents a modulo operation.

Specifically, the terminal device determines the frequency location of the symbol group whose number is 0 based on the random access configuration information, determines the frequency location of the symbol group P based on the first formula and the number i of the symbol group P, and determines the frequency location of the symbol group Q based on the second formula and the number i of the symbol group Q.

The preset rule may be, for example, specified in a protocol, or may be pre-configured by the network device. This is not limited in this embodiment of this application.

In a possible implementation, the first formula is related to the frequency location of the symbol group whose number is 0 and a function determined based on a number i and a pseudo-random sequence, or the first formula is related to a frequency location of a symbol group whose number is i−5 and a function determined based on the number i and a pseudo-random sequence, and the number i is a number of the symbol group P.

It can be learned that the frequency location of the symbol group P is related to the frequency location of the symbol group whose number is 0, or is related to a frequency location of a fifth symbol group before the symbol group P, and is irrelevant to a frequency location of another symbol group.

In a possible implementation, the second formula is related to a frequency location of a symbol group whose number is i−1 and a frequency location interval and a frequency hopping direction of a symbol group whose number is i relative to the symbol group whose number is i−1; and the number i is a number of the symbol group Q.

It can be learned that the frequency of the symbol group Q is related only to a frequency location of a previous symbol group adjacent to the symbol group Q, and is irrelevant to a frequency location of another symbol group.

It should be understood that the frequency location interval is an absolute value of a difference between subcarrier indexes.

In a possible implementation, the preset rule includes a formula 3 or a formula 4;

the formula 3 is:

$$\tilde{n}_{sc}^{RA}(i) = \begin{cases} (\tilde{n}_{sc}^{RA}(0) + f(i/5)) \bmod N_{sc}^{RA} & i \bmod 5 = 0 \text{ and } i > 0 \\ \tilde{n}_{sc}^{RA}(i-1) + 1 & i \bmod 5 = 1 \text{ and } \tilde{n}_{sc}^{RA}(i-1) \bmod 2 = 0 \\ \tilde{n}_{sc}^{RA}(i-1) - 1 & i \bmod 5 = 1 \text{ and } \tilde{n}_{sc}^{RA}(i-1) \bmod 2 = 1 \\ \tilde{n}_{sc}^{RA}(i-1) + 3 & i \bmod 5 = 2, 4 \text{ and } \lfloor \tilde{n}_{sc}^{RA}(i-1)/3 \rfloor \bmod 2 = 0 \\ \tilde{n}_{sc}^{RA}(i-1) - 3 & i \bmod 5 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i \bmod 5 = 3 \text{ and } \tilde{n}_{sc}^{RA}(i-1) < 18 \\ \tilde{n}_{sc}^{RA}(i-1) - 18 & i \bmod 5 = 3 \text{ and } \tilde{n}_{sc}^{RA}(i-1) \geq 18 \end{cases}$$

and the formula 4 is:

$$\tilde{n}_{sc}^{RA}(i) = \begin{cases} (\tilde{n}_{sc}^{RA}(i-5) + f(i/5)) \bmod N_{sc}^{RA} & i \bmod 5 = 0 \text{ and } i > 0 \\ \tilde{n}_{sc}^{RA}(i-1) + 1 & i \bmod 5 = 1 \text{ and } \tilde{n}_{sc}^{RA}(i-1) \bmod 2 = 0 \\ \tilde{n}_{sc}^{RA}(i-1) - 1 & i \bmod 5 = 1 \text{ and } \tilde{n}_{sc}^{RA}(i-1) \bmod 2 = 1 \\ \tilde{n}_{sc}^{RA}(i-1) + 3 & i \bmod 5 = 2, 4 \text{ and } \lfloor \tilde{n}_{sc}^{RA}(i-1)/3 \rfloor \bmod 2 = 0 \\ \tilde{n}_{sc}^{RA}(i-1) - 3 & i \bmod 5 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i \bmod 5 = 3 \text{ and } \tilde{n}_{sc}^{RA}(i-1) < 18 \\ \tilde{n}_{sc}^{RA}(i-1) - 18 & i \bmod 5 = 3 \text{ and } \tilde{n}_{sc}^{RA}(i-1) \geq 18 \end{cases}$$

where $\tilde{n}_{sc}^{RA}(i)$ is a frequency location of the symbol group whose number is i, $f(i/5)$ is a function determined based on the number i of the symbol group, $N_{sc}^{RA}$, and a pseudo-random sequence, $N_{sc}^{RA}$ is a transmission limitation on a random access preamble, $\lfloor \ \rfloor$ represents rounding down, $N_{sc}^{RA} > 0$, and $\tilde{n}_{sc}^{RA}(i) \geq 0$.

For the fourth aspect, refer to related descriptions of the third aspect. Details are not described herein again.

In the foregoing aspects, it should be understood that when the terminal device sends the random access preamble to the network device, the six symbol groups of the random access preamble may be consecutive or inconsecutive in time. This is not limited in this embodiment of this application.

It should be further understood that the terminal device may repeatedly send the random access preamble to the network device based on a configured quantity of repetitions, or repeatedly send the random access preamble to the network device in another quantity of repetitions. For example, the random access preamble is repeated only once in each transmission. In other words, only the six or five symbol groups are sent.

It should be noted that when the terminal device needs to repeatedly send the random access preamble to the network device based on the configured quantity of repetitions, duplicates of the random access preamble in different repetitions may be consecutive or inconsecutive in time. This is not limited in this embodiment of this application.

According to a fifth aspect, a communications device is provided, configured to perform the method in any one of the first aspect or the possible implementations of the first aspect, or configured to perform the method in any one of the third aspect or the possible implementations of the third aspect.

According to a sixth aspect, this application provides a network device, configured to perform the method in any one of the second aspect or the possible implementations of the second aspect, or configured to perform the method in any one of the fourth aspect or the possible implementations of the fourth aspect.

According to a seventh aspect, this application provides a terminal device. The terminal device includes a memory, a processor, and a transceiver. The memory stores a computer program that can run on the processor. When executing the computer program, the processor performs the method in any one of the first aspect or the possible implementations of the first aspect, or performs the method in any one of the third aspect or the possible implementations of the third aspect.

According to an eighth aspect, this application provides a network device. The network device includes a memory, a processor, and a transceiver. The memory stores a computer program that can run on the processor. When executing the computer program, the processor performs the method in any one of the second aspect or the possible implementations of the second aspect, or performs the method in any one of the fourth aspect or the possible implementations of the fourth aspect.

According to a ninth aspect, this application provides a computer-readable medium, configured to store a computer program. The computer program includes an instruction used to perform the method in any one of the foregoing aspects or the possible implementations of the foregoing aspects.

According to a tenth aspect, this application provides a computer program product including an instruction. When the computer program product runs on a computer, the computer is enabled to perform the method in the foregoing aspects or any possible implementation of the foregoing aspects.

According to an eleventh aspect, this application provides a chip including an input interface, an output interface, at least one processor, and a memory. The input interface, the output interface, the processor, and the memory communicate with each other through an internal connection path. The processor is configured to execute code in the memory. When the code is executed, the processor is configured to perform the method in any one of the foregoing aspects or the possible implementations of the foregoing aspects.

DESCRIPTION OF EMBODIMENTS

The following describes technical solutions of this application with reference to the accompanying drawings.

The technical solutions of embodiments of this application are applicable to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (MD) system, an LTE time division duplex (TDD), a universal mobile telecommunications system (UMTS), a worldwide interoperability for microwave access (WiMAX) communications system, a future 5th generation (5G) system, or new radio (NR).

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in the global system for mobile communications (GSM) or in code division multiple access (CDMA), may be a NodeB (NB) in the wideband code division multiple access (WCDMA) system, may be an evolved NodeB (eNB or eNodeB) in the LIFE system, or may be a radio controller in a cloud radio access network (CRAN) scenario. Alternatively, the network device may be a relay node, an access point, a vehicle-mounted device, a wearable device, a network device in the future 5G network, a network device in the future evolved PLMN network, or the like. This is not limited in the embodiments of this application.

For ease of understanding the embodiments of this application, a communications system to which the embodiments of this application are applicable is first briefly described with reference to FIG. 1.

Figure 1:
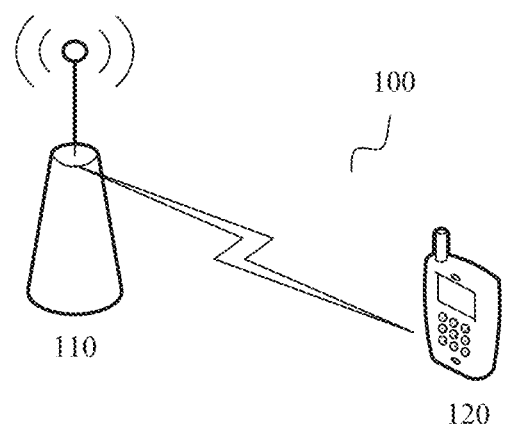
FIG. 1 is a schematic diagram of a communications system to which a communication method according to an embodiment of this application is applicable.

FIG. 1 is a schematic diagram of a communications system 100 to which a communication method according to an embodiment of this application is applicable. As shown in FIG. 1, the communications system 100 includes at least two communications devices, for example, a network device 110 and a terminal device 120. Data communication may be performed between the network device 110 and the terminal device 120 through a wireless connection. It should be understood that more terminal devices may be included in FIG. 1. This is not limited in this embodiment of this application.

The communications system 100 shown in FIG. 1 may be an NB-IoT system. In the communications system 100, the terminal device 120 can be scheduled to perform uplink transmission only after an uplink transmission time of the terminal device 120 is synchronized. The terminal device 120 establishes a connection to the network device 110 by using a random access procedure, and achieves uplink synchronization. In an NB-IoT, the random access procedure is an important method for the terminal device 120 to change from an idle mode to a connected mode by obtaining a dedicated channel resource. A narrowband random access channel (NPRACH) is a channel for transmitting a random access request.

The random access procedure is classified into a contention-based random access procedure and a non-contention-based random access procedure. Regardless of the contention-based random access procedure or the non-contention-based random access procedure, a random access preamble needs to be sent on the NPRACH. To be specific, a message (Msg) 1 is sent.

In an uplink frequency domain resource in the existing NB-IoT, a bandwidth of one NB-IoT carrier is 180 kHz, and a bandwidth of one subcarrier is 3.75 kHz. One NB-IoT random access preamble includes four symbol groups. One symbol group occupies one subcarrier. Frequency hopping exists between symbol groups. Transmission of each symbol group is limited to 12 subcarriers. A frequency-domain frequency hopping range is also within 12 subcarriers. A subcarrier bandwidth is 3.75 kHz. A frequency hopping interval between symbol groups is an integer multiple of the subcarrier bandwidth. A minimum frequency hopping interval is 3.75 kHz. In addition, to support different coverage enhancement levels, the network device configures different random access configuration parameters for the different coverage enhancement levels, for example, configures a quantity of repetitions of the random access preamble. During actual transmission, the terminal device repeatedly sends the random access preamble based on the quantity of repetitions configured by the network device. The following describes an existing NB-IoT random access preamble and a frequency hopping pattern of the existing NB-IoT random access preamble in detail with reference to FIG. 2.

Figure 2:
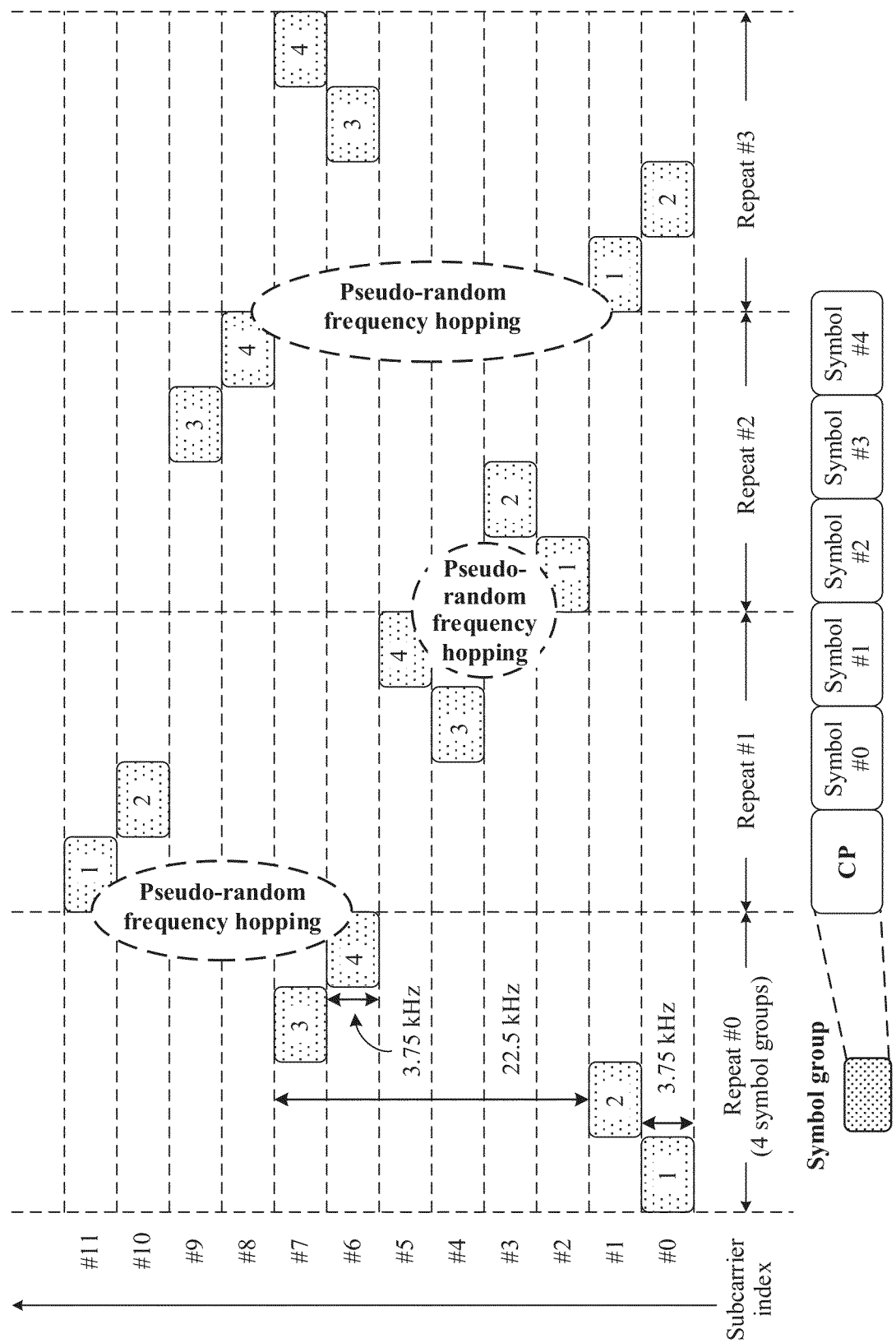
FIG. 2 shows a format and a frequency hopping pattern of an NB-IoT random access preamble.

Referring to FIG. 2, one NB-IoT random access preamble includes four symbol groups. The four symbol groups are denoted as a first symbol group, a second symbol group, a third symbol group, and a fourth symbol group in a time sequence. In FIG. 2, the four symbol groups are represented by using a rectangle with a filling pattern and a number. A symbol group whose number is 1 represents the first symbol group. A symbol group whose number is 2 represents the second symbol group. A symbol group whose number is 3 represents the third symbol group. A symbol group whose number is 4 represents the fourth symbol group. A quantity of repetitions of a random access preamble is 4 (in other words, #0 to #3 are repeated). In other words, a terminal device repeatedly sends the random access preamble four times in one transmission. To be specific, 4*4 symbol groups are sent. #0 to #11 indicate 12 subcarriers. The random access preamble has two frequency hopping intervals in one repetition period: 3.75 kHz and 22.5 kHz, A frequency hopping interval between the first symbol group and the second symbol group is 3.75 kHz. A frequency hopping interval between the third symbol group and the fourth symbol group is 3.75 kHz. A frequency hopping direction from the first symbol group to the second symbol group is opposite to a frequency hopping direction from the third symbol group to the fourth symbol group. A frequency hopping interval between the second symbol group and the third symbol group is 22.5 kHz. Pseudo-random frequency hopping is used between two adjacent repetitions (as signed in a dashed ellipse in FIG. 2). A pseudo-random frequency hopping range is limited to the 12 subcarriers.

Each symbol group in the NB-IoT random access preamble includes one CP and five symbols (namely, symbols #0 to #4 in FIG. 2). Each symbol carries a sequence. A time length of each symbol is a reciprocal of an NB-IoT uplink subcarrier bandwidth. As shown in Table 1, a format of the existing NB-IoT random access preamble includes a format 0 or a format 1. The format 0 and the format 1 support different time lengths $T_{CP}$ of CPs. The format 0 supports a maximum cell radius of 10 km. The format 1 supports a maximum cell radius of 40 km. Total time lengths $T_{SEQ}$ of five symbols in the format 0 and the format 1 are equal.

TABLE 1

| Preamble format | $T_{CP}$ (μs) | $T_{SEQ}$ (μs) | Maximum cell radius (km) |
| --- | --- | --- | --- |
| 0 | 66.7 | 5*266.67 | 10 |
| 1 | 266.67 | 5*266.67 | 40 |

According to Table 1, the existing NB-IoT random access preamble supports a cell radius of 40 kilometers (km). For an application oriented for an open area in an internet of things, for example, a smart lake or co-site with a long term evolution (LTE) system, the random access preamble needs to support a larger cell. To support a larger cell radius, the format of the random access preamble needs to be redesigned. However, a current frequency hopping pattern of the random access preamble may not be applicable to a redesigned random access preamble.

Figure 3:
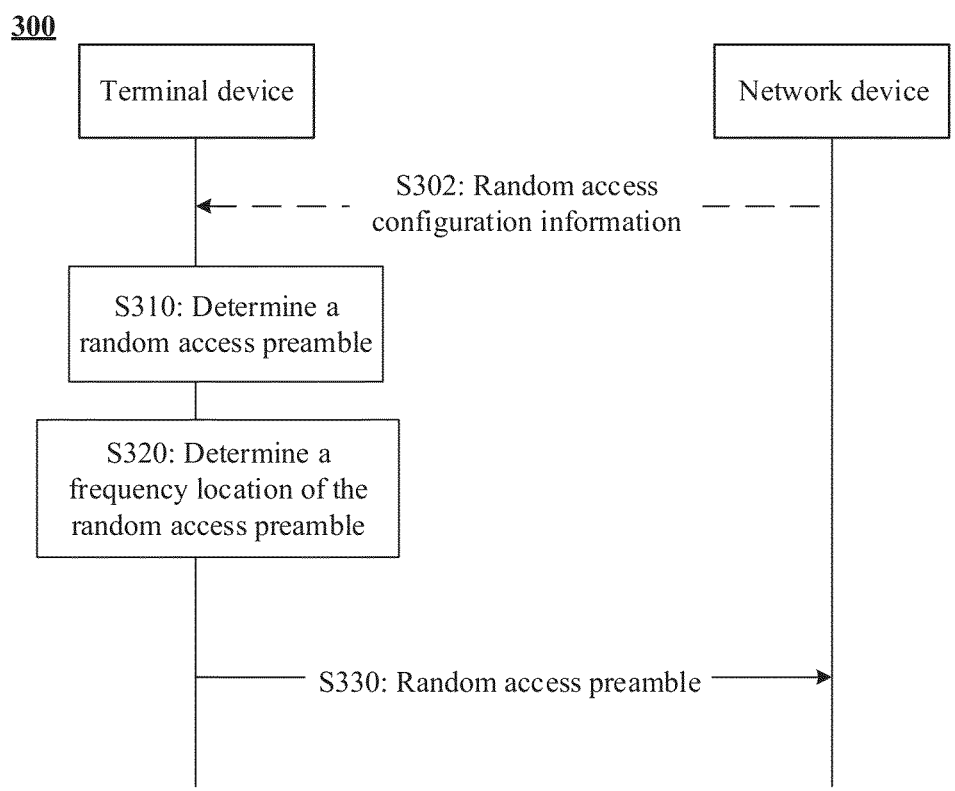
FIG. 3 is a schematic flowchart of a communication method according to an embodiment of this application.

In view of this, this application provides a communication method. In the method, random access may be performed based on a frequency hopping pattern that matches a redesigned random access preamble. The following describes this application in detail. FIG. 3 is a schematic flowchart of a communication method 300 according to an embodiment of this application. As shown in FIG. 3, the communication method 300 may include S310, S320, and S330. It should be understood that a terminal device and a network device in FIG. 3 may be respectively the terminal device 120 and the network device 110 shown in FIG. 1. However, this is not limited in this embodiment of this application.

S310: The terminal device determines a random access preamble.

S320: The terminal device determines a frequency location of the random access preamble.

S330: The terminal device sends the random access preamble to the network device based on the frequency location. Correspondingly, the network device receives the random access preamble sent by the terminal device.

In this embodiment of this application, the random access preamble may include six symbol groups, or may include five symbol groups. The following separately describes in detail a case in which the random access preamble includes the six symbol groups (namely, a case 1) and a case in which the random access preamble includes the five symbol groups (namely, a case 2)

Case 1

In step S310, the random access preamble includes the six symbol groups.

Optionally, a format of the random access preamble may be a format 2, a format 3, or a format 4 in Table 2.

TABLE 2

| Preamble format | $T_{CP}$ (μs) | $T_{SEQ}$ (μs) | Maximum cell radius (km) |
|---|---|---|---|
| 2 | 800 | 1*800 | 120 |
| 3 | 800 | 2*800 | 120 |
| 4 | 800 | 3*800 | 120 |

In other words, any one of the six symbol groups may include one CP and one symbol, one CP and two symbols, or one CP and three symbols, Time lengths of both the CP and the symbol herein may be 800 μs. The time length of the CP is $T_{CP}$. A total length of symbols included in one symbol group is $T_{SEQ}$.

A maximum cell radius is related to a guard time (GT). A longer guard time corresponds to a larger covered maximum cell radius. The guard time is related to the CP and a total length of symbols in the symbol group. In addition, the time length of the CP should cover the maximum cell radius. According to a formula S=V*T, V is a speed of light of $3.0*10^8$ m/s, and $S=2*100*10^3$ m. Therefore, T=666.7 μs may be obtained by substituting the two values into the formula S=V*T. However, the time length $T_{CP}$ of the CP is 800 μs, and is greater than 666.7 μs. Therefore, in this application, the format of the random access preamble shown in Table 2 is set, so that the random access preamble can support a maximum cell radius of 100 km.

It should be understood that the format of the random access preamble and the time lengths of the CP and the symbol are merely examples for description. The format of the random access preamble and the time lengths of the CP and the symbol are not specifically limited in this application. For example, each symbol group may also include one CP and four symbols. Alternatively, the time length of the symbol may be 700 μs, or the like.

It should be further understood that a format index of the random access preamble and a correspondence between a format index and a specific format are merely examples for description, and do not constitute any limitation on this application. For example, in a random access preamble whose format index is 2, any symbol group may include one CP and two symbols. For another example, if any symbol group of one random access preamble includes one CP and three symbols, a format index of the random access preamble is 2.

Further, a sequence carried on each symbol in the symbol group may be the same. For example, the sequence carried on each symbol is a, and sequences that may be carried on E symbols are $$\underbrace{a, a, \ldots a}_{E},$$

where a may be a real number, for example, 1 or −1, or a may be a complex number, for example, j or −j, and j represents an imaginary unit, and satisfies $j^2=-1$. Sequences carried on the symbols in the symbol group may be different, or sequences carried on some symbols in the symbol group may be the same, and sequences carried on the other symbols may be different. This is not limited in this embodiment of this application.

In addition, sequences carried in any two symbol groups may be the same, or may be different. This is not limited in this embodiment of this application.

The random access preamble in this embodiment of this application may be a random access preamble that is not scrambled by using a scrambling sequence, or may be a random access preamble that is scrambled by using a scrambling sequence. This is not limited herein. Scrambling is performed to improve interference randomization performance and avoid a false alarm caused by inter-cell interference.

A length of a scrambling code sequence obtained by the terminal device based on a base sequence may have a plurality of cases. Specifically, the length of the scrambling code sequence may be the same as the quantities of symbols in a symbol group of the random access preamble, the length of the scrambling code sequence may be the same as the quantities of symbols in a repetition period of the random access preamble, or the length of the scrambling code sequence may be the same as the quantities of symbols in all repetition periods of the random access preamble. The length of the scrambling code sequence may be the same as a sum of a cyclic prefix and the quantity of symbols in the symbol group of the random access preamble, the length of the scrambling code sequence may be the same as a sum of a cyclic prefix and the quantity of symbols in the repetition period of the random access preamble, or the length of the scrambling code sequence may be the same as a sum of cyclic prefixes and the quantity of symbols in all the repetition periods of the random access preamble. The length of the scrambling code sequence is not limited in this application.

The terminal device may generate the base sequence in a manner that is set inside the terminal device, or obtain the base sequence through query, There may be a plurality of methods for the terminal device to obtain the scrambling code sequence based on the base sequence. In an optional method 1, the scrambling sequence is the base sequence, and the scrambling sequence and the base sequence are equal. For example, the base sequence is ABC, and the obtained scrambling code sequence is ABC. In an optional method 2, each element in the base sequence is sequentially repeated for M times to obtain the scrambling code sequence. To be specific, the terminal device repeats a first element in the base sequence for M times, repeats a second element for M times, . . . , and repeats a last element for M times. For example, the base sequence is ABC, each element in the base sequence is sequentially repeated twice to obtain AABBCC. For example, the base sequence is AB, and each element in the base sequence is sequentially repeated three times to obtain AAABBB.

The terminal device may obtain scrambling code indication information sent by the network device. The scrambling code indication information is used to indicate the terminal device to scramble the random access preamble by using the method 1 or the method 2.

In an optional method, the parameter index may have different values corresponding to the method 1 and/or the method 2. For example, when a value of the parameter index is 0, it indicates that the terminal device scrambles the random access preamble by using the method 1. When a value of the parameter index is 1, it indicates that the terminal device scrambles the random access preamble by using the method 2. For details, refer to Table 3.

TABLE 3

| Parameter index | Scrambling method |
| --- | --- |
| 0 | Method 1 |
| 1 | Method 2 |

In an optional method, when the terminal device receives the scrambling code indication information sent by the network device, the terminal device scrambles the random access preamble by using the method 1. When the terminal device does not receive the scrambling code indication information sent by the network device, the terminal device scrambles the random access preamble by using the method 2.

In an optional method, the scrambling code indication information includes two states: a first state and a second state. When the scrambling code indication information indicates the first state, the terminal device scrambles the random access preamble by using the method 1, When the scrambling code indication information indicates the second state, the terminal device scrambles the random access preamble by using the method 2.

The base sequence or the scrambling code sequence may be an orthogonal sequence, a ZC sequence, a pseudo-random sequence, a differential orthogonal sequence, an orthogonal sequence obtained after an added scrambling code is differentiated on a symbol group in each repetition period, a subset of an orthogonal sequence obtained after an added scrambling code is differentiated on a symbol group in each repetition period, or the like. The orthogonal sequence may be a Walsh sequence. The pseudo-random sequence may be an m-sequence, an M-sequence, a Gold sequence, or the like. An initialization seed of the pseudo-random sequence is a function of at least one of a cell identifier, a hyper frame number, a frame number, a symbol index, a symbol group index, a repetition quantity, a subcarrier index, a carrier index, or the like. Preferably, the base sequence or the scrambling code sequence may be expressed by a formula $c(m)=e^{j2um\pi/k}$, where m=0, 1, 2, or k−1, and u is an index of a scrambling code sequence, $u=N_{ID}^{Ncell} \mod k$ or $u=N_{ID}^{Ncell} \mod(k-1)$, where $N_{ID}^{Ncell}$ is a cell identifier, and k is a length of the scrambling code sequence.

Optionally, in an embodiment of this application, before S310 is performed, the method may further include:

S302: The network device sends random access configuration information to the terminal device. The random access configuration information is used to indicate to the terminal device to determine the random access preamble, or the random access configuration information may include format information of the random access preamble. Correspondingly, in step S310, the terminal device may determine the random access preamble based on the random access configuration information.

Specifically, the network device determines the random access configuration information, and sends the random access configuration information to the terminal device. The terminal device may determine the random access preamble based on the random access configuration information. For example, the random access configuration information may include the format index of the random access preamble, a quantity of symbols included in each symbol group, or the length of the CP. The format index of the random access preamble, the quantity of symbols included in each symbol group, or the length of the CP may be used to indicate the random access preamble or the format of the random access preamble. The format of the random access preamble shown in Table 2 is used as an example. If the random access configuration information includes an index 2, the terminal device may determine that the random access preamble includes one CP and one symbol, and a time length of the CP and a time length of each symbol are both 800 μs.

In addition to the foregoing information, the random access configuration information may further include a random access resource period, a start subcarrier frequency domain location, a quantity of subcarriers allocated for random access, a quantity of repetitions of the random access preamble, a random access start moment, and a maximum quantity of attempts at each coverage enhancement level of the random access preamble, a maximum quantity of attempts of the random access preamble, an initial target receive power of the random access preamble, a reference signal received power (RSRP) threshold, and the like. For a specific meaning of a parameter included in the random access configuration information, refer to a description in the related technology. For brevity, details are not described herein.

In a possible implementation, in step S302, the network device may send the random access configuration information to the terminal device based on system information, for example, a system information block 2 (S1132).

In another possible implementation, the network device may send the random access configuration information in a manner such as broadcast, or by using radio resource control (RRC) dedicated signaling, a media access control (MAC) control element, or downlink control information (DCI). In addition, the network device may further send the random access configuration information to the terminal device in another manner. This is not limited in this embodiment of this application.

In step S320, the six symbol groups included in the random access preamble are denoted as a first symbol group, a second symbol group, a third symbol group, a fourth symbol group, a fifth symbol group, and a sixth symbol group in a time sequence. A frequency hopping interval between the first symbol group and the second symbol group and a frequency hopping interval between the fifth symbol group and the sixth symbol group are equal and both are first intervals. A frequency hopping interval between the second symbol group and the third symbol group and a frequency hopping interval between the fourth symbol group and the fifth symbol group are equal and both are second intervals. A frequency hopping interval between the third symbol group and the fourth symbol group is a third interval. The first interval, the second interval, and the third interval are unequal and are not equal to zero.

It should be understood that, in this embodiment of this application, a frequency interval between any two adjacent symbol groups in the six symbol groups is a frequency hopping interval between the two symbol groups. In other words, an absolute value of a frequency difference between any two adjacent symbol groups in the six symbol groups is the frequency hopping interval between the two symbol groups, or regardless of the time sequence, for any two adjacent symbol groups in the six symbol groups, a frequency difference between a symbol group with a larger frequency and a symbol group with a smaller frequency is the frequency hopping interval. It should be further understood that the frequency location interval between every two adjacent symbol groups is the absolute value of a difference between frequency locations. The frequency hopping interval between two adjacent symbol groups is equal to a value obtained by multiplying a frequency location interval between the two adjacent symbol groups by a subcarrier bandwidth.

For example, the frequency hopping interval between adjacent symbol groups may be an integer multiple of the subcarrier bandwidth. For example, the subcarrier bandwidth is 1.25 kHz, and the frequency hopping interval between the adjacent symbol groups may be N*1.25 kHz, where N is a positive integer. Alternatively, the frequency hopping interval between the adjacent symbol groups may not be the integer multiple of the subcarrier bandwidth. Whether the frequency hopping interval between the adjacent symbol groups is the integer multiple of the subcarrier bandwidth is not limited in this embodiment of this application.

Optionally, the first interval may be less than the second interval, and the second interval may be less than the third interval.

It should be understood that a limitation on a value relationship among the first interval, the second interval, and the third interval is merely an example for description, and shall not constitute any limitation on this application. For example, the first interval may be greater than the second interval, and the second interval may be greater than the third interval.

Optionally, the first interval may be 1.25 kHz.
Optionally, the second interval may be 3.75 kHz.
Optionally, the third interval may be 22.5 kHz.

It should be understood that values of the first interval, the second interval, and the third interval are not specifically limited in this embodiment of this application. The embodiment is merely an example for description, and shall not constitute any limitation on this application. For example, the first interval may alternatively be 2.5 kHz, and the second interval may alternatively be 1.25 kHz. For another example, the third interval may be 12.5 kHz.

Further, a frequency hopping direction from the first symbol group to the second symbol group is opposite to a frequency hopping direction from the fifth symbol group to the sixth symbol group, and a frequency hopping direction from the second symbol group to the third symbol group is opposite to a frequency hopping direction from the fourth symbol group to the fifth symbol group.

In other words, if a frequency of the first symbol group is less than a frequency of the second symbol group, a frequency of the fifth symbol group is greater than a frequency of the sixth symbol group. If the frequency of the first symbol group is greater than the frequency of the second symbol group, the frequency of the fifth symbol group is less than the frequency of the sixth symbol group. If the frequency of the second symbol group is less than a frequency of the third symbol group, a frequency of the fourth symbol group is greater than the frequency of the fifth symbol group. If the frequency of the second symbol group is greater than the frequency of the third symbol group, the frequency of the fourth symbol group is less than the frequency of the fifth symbol group.

Further, the frequency hopping direction from the first symbol group to the second symbol group may be the same as the frequency hopping direction from the second symbol group to the third symbol group. In other words, the frequency of the first symbol group is less than the frequency of the second symbol group, and the frequency of the second symbol group is less than the frequency of the third symbol group. Alternatively, the frequency of the first symbol group is greater than the frequency of the second symbol group, and the frequency of the second symbol group is greater than the frequency of the third symbol group.

In addition, the frequency hopping direction from the first symbol group to the second symbol group may be different from the frequency hopping direction from the second symbol group to the third symbol group. A relationship between the frequency hopping direction from the first symbol group to the second symbol group and the frequency hopping direction from the second symbol group to the third symbol group is not limited in this embodiment of this application.

According to the communication method in this embodiment of this application, the terminal device determines a frequency hopping pattern (namely, a frequency location of each symbol group) of the random access preamble including the six symbol groups, to send the random access preamble and perform random access.

Figure 4:
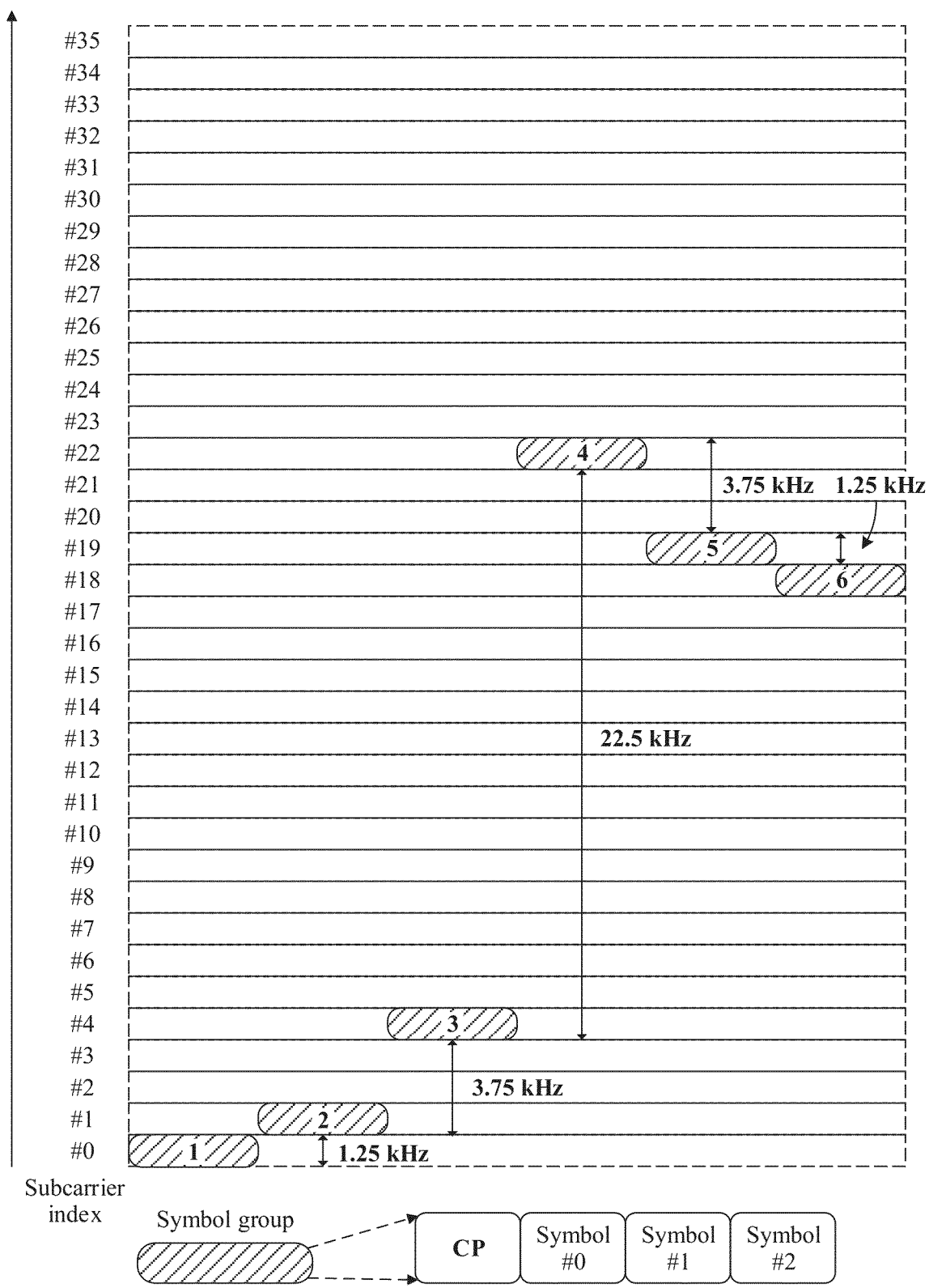
FIG. 4 shows a format and a frequency hopping pattern of a random access preamble according to an embodiment of this application.

The following describes a frequency hopping pattern of a random access preamble with reference to FIG. 4.

As shown in FIG. 4, the random access preamble includes six symbol groups: a symbol group 1, a symbol group 2, a symbol group 3, a symbol group 4, a symbol group 5, and a symbol group 6. Each symbol group includes one CP, a symbol #0, a symbol #1, and a symbol #2. #0 to #35 indicate 36 subcarriers. A frequency hopping interval between the symbol group 1 and the symbol group 2 is 1.25 kHz obtained by subtracting a frequency of the symbol group 1 from a frequency of the symbol group 2. In other words, the frequency hopping interval between the symbol group 1 and the symbol group 2 is 1.25 kHz. A frequency hopping interval between the symbol group 2 and the symbol group 3 is 3.75 kHz. A frequency hopping interval between the symbol group 3 and the symbol group 4 is 22.5 kHz. A frequency hopping interval between the symbol group 4 and the symbol group 5 is 3.75 kHz. A frequency hopping interval between the symbol group 5 and the symbol group 6 is 1.25 kHz. A frequency hopping direction from the symbol group 1 to the symbol group 2 is opposite to a frequency hopping direction from the symbol group 5 to the symbol group 6, and a frequency hopping direction form the symbol group 2 to the symbol group 3 is opposite to a frequency hopping direction from the symbol group 4 to the symbol group 5.

It should be understood that the symbol group 1 to the symbol group 6 may respectively correspond to the foregoing first symbol group to the foregoing sixth symbol group.

Through simulation, when the random access preamble is sent based on the frequency hopping pattern shown in FIG. 4, a sequence correlation is comparatively good, and accuracy of estimated uplink timing can be improved. In addition, an existing random access preamble may be used for frequency hopping in 12 subcarriers (namely, 45 kHz). When a subcarrier bandwidth is reduced from 3.75 kHz to 1.25 kHz in this embodiment of this application, on a basis that an NPRACH resource of 45 kHz is maintained, a frequency hopping range of the random access preamble in this embodiment of this application may be increased from 12 subcarriers to 36 subcarriers. Therefore, the frequency hopping pattern provided in FIG. 4 can support more users in reusing the NPRACH resource to perform random access. In other words, compared with an existing solution with 45 kHz supporting 12 users, this application can support reuse by 36 users.

In this embodiment of this application, the six symbol groups of the random access preamble may be classified into two groups, and each group includes three symbol groups. A frequency hopping interval between a first symbol group and a second symbol group in a first group and a frequency hopping interval between a first symbol group and a second symbol group in a second group are equal and both are first intervals. A frequency hopping interval between the second symbol group and a third symbol group in the first group and a frequency hopping interval between the second symbol group and a third symbol group in the second group are equal and both are second intervals. A frequency hopping interval between the third symbol group in the first group and the first symbol group in the second group is a third interval.

Optionally, a frequency hopping direction from the first symbol group to the second symbol group in the first group is opposite to a frequency hopping direction from the first symbol group to the second symbol group in the second group. A frequency hopping direction from the second symbol group to the third symbol group in the first group is opposite to a frequency hopping direction from the second symbol group to the third symbol group in the second group. Alternatively, frequency hopping directions among three symbol groups in the first group are opposite to frequency hopping directions among three symbol groups in the second group.

For example, referring to FIG. 4, the first group includes the symbol group 1 to the symbol group 3, and the second group includes the symbol group 4 to the symbol group 6. The frequency hopping interval between the symbol group 1 and the symbol group 2 and the frequency hopping interval between the symbol group 4 and the symbol group 5 are both a first interval. The frequency hopping interval between the symbol group 2 and the symbol group 3 and the frequency hopping interval between the symbol group 5 and the symbol group 6 are both a second interval. The frequency hopping interval between the symbol group 3 and the symbol group 4 is a third interval. The frequency hopping direction from the symbol group 1 to the symbol group 2 is opposite to the frequency hopping direction from the symbol group 5 to the symbol group 6, and the frequency hopping direction form the symbol group 2 to the symbol group 3 is opposite to the frequency hopping direction from the symbol group 4 to the symbol group 5.

It should be understood that the symbol group 1 to the symbol group 3 in FIG. 4 may respectively correspond to the first symbol group to the third symbol group in the first group, and the symbol group 4 to the symbol group 6 may respectively correspond to the first symbol group to the third symbol group in the second group.

Optionally, in a specific implementation of step S320, the terminal device may determine the frequency location of the random access preamble based on the random access configuration information and a preset rule.

It should be noted that "the frequency location" in this application indicates an index or a number of a subcarrier.

For example, the random access configuration information may include a quantity W of repetitions of the random access preamble. 6*W symbol groups included in the random access preamble in the W repetitions are numbered 0, 1, ..., i, ..., 6W−2, and 6W−1 in a time sequence, and W is a positive integer. It should be understood that a number i of the 6*W symbol groups is greater than or equal to 0, and is less than or equal to 6W−1. For example, if W=2, the 12 symbol groups included in the random access preamble in the two repetitions are respectively numbered 0, 1, 2, 3, 4, 5, 6, 7, 8, 9, 10, and 11 in the time sequence. It should be understood that when W=2, the terminal device sends 12 symbol groups in step S330. The random access configuration information may further be used to determine a frequency location of a symbol group whose number is 0.

The preset rule includes a first formula and a second formula. The First formula and the second formula may be used to calculate a frequency location of each symbol group. The first formula and a number i of a symbol group P are used to determine a frequency location of the symbol group P. The second formula and a number i of a symbol group Q are used to determine a frequency location of the symbol group Q. The symbol group P is a symbol group whose number satisfies i>0 and imod6=0 in the 6*W symbol groups. The symbol group Q is a symbol group whose number satisfies i>0 and imod6≠0 in the 6*W symbol groups. Alternatively, the symbol group P is a symbol group whose number is i in the 6*W symbol groups, where i satisfies i>0, and imod6=0, where mod represents a modulo operation. The symbol group Q is a symbol group other than the symbol group whose number is 0 and the symbol group P in the 6*W symbol groups. For example, if W=2, after being repeated twice, the random access preamble includes 12 symbol groups in total, the symbol group P is the symbol group whose number is 6 in the 12 symbol groups, and the symbol group Q is a symbol group whose number is 1, 2, 3, 4, 5, 7, 8, 9, 10, or 11 in the 12 symbol groups.

The preset rule may be, for example, specified in a protocol, or may be configured by the network device. This is not limited in this embodiment of this application.

In other words, the terminal device determines the frequency location of the symbol group whose number is 0 based on the random access configuration information, determines the frequency location of the symbol group P based on the first formula and the number i of the symbol group P, and determines the frequency location of the symbol group Q based on the second formula and the number i of the symbol group Q.

For another example, the random access configuration information may further include a quantity W of repetitions, a frequency location of each symbol group in a first repetition, and a frequency hopping interval between a first symbol group in a next repetition and a sixth symbol group in a previous repetition. Based on the information, the terminal device may determine the frequency location of each symbol group in each repetition period in the W repetitions.

In this application, the terminal device may alternatively determine the frequency location of the random access preamble based on only the random access configuration information. For example, the random access configuration information may include the frequency location of each of the 6*W symbol groups. It should be understood that a manner in which the terminal device determines the frequency location of the random access preamble is not limited in this embodiment of application.

In an example of the first formula, the first formula is related to the frequency location of the symbol group whose number is 0 and a function determined based on a number i and a pseudo-random sequence, or the first formula is related to a frequency location of a symbol group whose number is i−6 and a function determined based on a number i and a pseudo-random sequence; and the number i is a number of the symbol group P.

In other words, the symbol group P may be determined based on the frequency location of the symbol group whose number is 0, and the function determined by the number i of the symbol group P and the pseudo-random sequence. Alternatively, the symbol group P may be determined based on the frequency location of the symbol group whose number is i−6, and the function determined by the number i of the symbol group P and the pseudo-random sequence. It can be learned that the frequency location of the symbol group P is related to the frequency location of the symbol group whose number is 0, or is related to a frequency location of a sixth symbol group before the symbol group P, and is irrelevant to a frequency location of another symbol group.

In an example of the second formula, the second formula is related to a frequency location of a symbol group whose number is i−1 and a frequency location interval and a frequency hopping direction of a symbol group whose number is i relative to the symbol group whose number is i−1; and the number i is a number of the symbol group Q.

In other words, the frequency location of the symbol group Q may be determined based on the frequency location of a previous symbol group whose number is i−1 and that is adjacent to the symbol group Q, a frequency hopping interval and a frequency hopping direction of the symbol group Q relative to the previous symbol group adjacent to the symbol group Q. It can be learned that the frequency location of the symbol group Q is related only to the frequency location of the previous symbol group adjacent to the symbol group Q, and is irrelevant to a frequency location of another symbol group.

It should be understood that the frequency location interval is an absolute value of a difference between frequency locations.

Optionally, the preset rule may include a formula 1 or a formula 2;

the formula 1 is:

$$\tilde{n}_{sc}^{RA}(i) = \begin{cases} (\tilde{n}_{sc}^{RA}(0) + f(i/6)) \bmod N_{sc}^{RA} & i \bmod 6 = 0 \text{ and } i > 0 \\ \tilde{n}_{sc}^{RA}(i-1) + 1 & i \bmod 6 = 1, 5 \text{ and } \tilde{n}_{sc}^{RA}(i-1) \bmod 2 = 0 \\ \tilde{n}_{sc}^{RA}(i-1) - 1 & i \bmod 6 = 1, 5 \text{ and } \tilde{n}_{sc}^{RA}(i-1) \bmod 2 = 1 \\ \tilde{n}_{sc}^{RA}(i-1) + 3 & i \bmod 6 = 2, 4 \text{ and } \lfloor \tilde{n}_{sc}^{RA}(i-1)/3 \rfloor \bmod 2 = 0 \\ \tilde{n}_{sc}^{RA}(i-1) - 3 & i \bmod 6 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i \bmod 6 = 3 \text{ and } \tilde{n}_{sc}^{RA}(i-1) < 18 \\ \tilde{n}_{sc}^{RA}(i-1) - 18 & i \bmod 6 = 3 \text{ and } \tilde{n}_{sc}^{RA}(i-1) \geq 18 \end{cases};$$

and
the formula 2 is:

$$\tilde{n}_{sc}^{RA}(i) = \begin{cases} (\tilde{n}_{sc}^{RA}(i-6) + f(i/6)) \bmod N_{sc}^{RA} & i \bmod 6 = 0 \text{ and } i > 0 \\ \tilde{n}_{sc}^{RA}(i-1) + 1 & i \bmod 6 = 1, 5 \text{ and } \tilde{n}_{sc}^{RA}(i-1) \bmod 2 = 0 \\ \tilde{n}_{sc}^{RA}(i-1) - 1 & i \bmod 6 = 1, 5 \text{ and } \tilde{n}_{sc}^{RA}(i-1) \bmod 2 = 1 \\ \tilde{n}_{sc}^{RA}(i-1) + 3 & i \bmod 6 = 2, 4 \text{ and } \lfloor \tilde{n}_{sc}^{RA}(i-1)/3 \rfloor \bmod 2 = 0 \\ \tilde{n}_{sc}^{RA}(i-1) - 3 & i \bmod 6 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i \bmod 6 = 3 \text{ and } \tilde{n}_{sc}^{RA}(i-1) < 18 \\ \tilde{n}_{sc}^{RA}(i-1) - 18 & i \bmod 6 = 3 \text{ and } \tilde{n}_{sc}^{RA}(i-1) \geq 18 \end{cases};$$

where $\tilde{n}_{sc}^{RA}(i)$ is a frequency location of the symbol group whose number is i, $f(i/6)$ is a function determined based on the number i of the symbol group, $N_{sc}^{RA}$, and a pseudo-random sequence, $N_{sc}^{RA}$ is a transmission limitation on a random access preamble, $\lfloor \; \rfloor$ represents rounding down, $N_{sc}^{RA} > 0$, and $\tilde{n}_{sc}^{RA}(i) \geq 0$.

Herein, $N_{sc}^{RA}$ may be specified in a protocol, may be notified by the network device to the terminal device, may be a fixed value, or may be one of some candidate values. For example, the network device may use the random access configuration information to carry $N_{sc}^{RA}$. When the subcarrier bandwidth is 1.25 kHz, $N_{sc}^{RA}$ may be equal to 36. This is not limited herein. For example, $N_{sc}^{RA}$ may alternatively be 72. A value of $N_{sc}^{RA}$ may be equal to $N_{sc}^{NPRACH}$, or a value of $N_{sc}^{RA}$ may be associated with or bound to $N_{sc}^{NPRACH}$. For example, $N_{sc}^{RA}$ is associated with $N_{sc}^{NPRACH}$ by using some correspondences in a table. This is not limited herein. $N_{sc}^{NPRACH}$ is a parameter in the random access configuration information sent by the network device to the terminal device, and represents a quantity of subcarriers used for random access.

It should be understood that a first row in the formula 1 or the formula 2 may be the foregoing first formula, and a second row to a seventh row in the formula 1 or the formula 2 may be the foregoing second formula. It should be further understood that, the frequency location interval and the frequency hopping direction of the symbol group whose number is i relative to the symbol group whose number is i−1 may be determined according to the formula in the second row to the seventh row. For example, the second row in the formula 1 or the formula 2 is used as an example. $\tilde{n}_{sc}^{RA}(i-1)$ is the frequency location of the symbol group whose number is i−1. The following "+1" represents that the frequency location of the symbol group Whose number is i is greater than the frequency location of the symbol group whose number is i−1, and the frequency hopping interval between the symbol group whose number is i and the symbol group whose number is i−1 is one subcarrier. According to a recurrence relationship, as long as a frequency location of the first symbol group is determined, the frequency location of each symbol group after the first symbol group may be determined based on the frequency location interval and the frequency hopping direction of the symbol group whose number is i relative to the symbol group whose number is i−1.

In an example, in this embodiment of this application, the frequency location of the symbol group whose number is 0 is $\tilde{n}_{sc}^{RA}(0) = n_{init} \bmod N_{sc}^{RA}$, where $n_{init}$ is an index of a subcarrier selected from $\{0, 1, \ldots, N_{sc}^{NPRACH}-1\}$ at a MAC layer, and $N_{sc}^{NPRACH}$ represents a quantity of subcarriers used for random access.

For example, in this embodiment of this application, a value of $f(i/6)$ may be determined based on a function $f(t)$ of the pseudo-random sequence c(n). $f(t)$ may be expressed as $$f(t) = \left( f(t+1) + \left( \sum_{n=10t+1}^{10t+9} c(n) 2^{n-(10t+1)} \right) \bmod(N_{sc}^{RA} - 1) + 1 \right) \bmod N_{sc}^{RA},$$

where $f(-1)=0$ and c(n) may be an m-sequence, an M-sequence, a Gold sequence, or the like. This is not limited in this embodiment of this application. Further, an initialization seed of c(n) may be a physical-layer cell identifier of the terminal device, or a function of a physical-layer cell identifier.

For example, c(n) may represent a Gold sequence with a length of 31. A length of the Gold sequence is denoted as $M_{PN}$. n=0, 1, ..., $M_{PN}-1$ and c(n) may be expressed as:

$c(n)=(x_1(n+N_C)+x_2(n+N_C)) \bmod 2$, $x_1(n+31)=(x_1(n+3)+x_1(n)) \bmod 2$, $x_2(n+31)=(x_2(n+3)+x_2(n+2)+x_2(n+1)+x_2(n)) \bmod 2$, where $N_C=600$. An initialization seed of a first m-sequence satisfies $x_1(0)=1$, $x_1(n)=0$, n=1, 2, ..., 30, and an initialization seed of a second m-sequence is expressed as $c_{init}=\Sigma_{k=0}^{30} x_2(k) \cdot 2^k$. $c_{init}=N_{ID}^{Ncell}$, where $N_{ID}^{Ncell}$ is a physical-layer cell identifier.

It should be noted that the foregoing expression is merely an example. A specific representation form of an index expression is not limited in this application, and a representation in another form also falls within be protection scope of this application. It should be understood that the formula 1 and the formula 2 and examples related to the formula 1 and the formula 2 are all applicable to the following configurations: The subcarrier bandwidth is configured as 1.25 kHz, transmission of the random access preamble is limited to $N_{sc}^{RA}=36$ subcarriers, and a frequency hopping range between symbol groups is within 36 subcarriers. The formula 1 and the formula 2 and the examples related to the formula 1 and the formula 2 are further applicable to another configuration. This is not specifically limited in this embodiment of this application.

It should be further understood that the foregoing uses only an example in which the pseudo-random frequency hopping is used as the frequency hopping interval of the random access preamble in different repetitions, but this should not constitute any limitation on this application. In this application, the pseudo-random frequency hopping may not be used in the random access preamble in the different repetitions. For example, frequency locations of first symbol groups in six symbol groups included in the random access preamble in any two repetitions may be the same.

It should be noted that, regardless of the case 1 or the following case 2, the "frequency location" described in this application may be a relative frequency location or an absolute frequency location. It should be understood that the terminal device sends the random access preamble on a frequency corresponding to the absolute frequency location of a symbol group.

When the frequency location $\tilde{n}_{sc}^{RA}(i)$ is a relative frequency location, to be specific, when $\tilde{n}_{sc}^{RA}(i)$ is a relative frequency location of an $i^{th}$ symbol group, an absolute frequency location of the $i^{th}$ symbol group is denoted as $N_{sc}^{RA}(i)$. In this case, $N_{sc}^{RA}(i)=n_{start}+\tilde{n}_{sc}^{RA}(i)$, where $n_{start}$ is an offset frequency location. It can be learned from the expression that the absolute frequency location of the $i^{th}$ symbol group may be determined based on the frequency location of the $i^{th}$ symbol group and the offset frequency location that are determined by the terminal device.

For example, the offset frequency location $n_{start}$ satisfies $n_{start}=N_{scoffset}^{NPRACH}+\lfloor n_{init}/N_{sc}^{RA} \rfloor * N_{sc}^{RA}$, where $n_{init}$ is an index of a subcarrier selected from $\{0, 1, \ldots, N_{sc}^{NPRACH}-1\}$ at a MAC layer, $N_{scoffset}^{NPRACH}$ and $N_{sc}^{NPRACH}$ are two parameters in the random access configuration information, $N_{scoffset}^{NPRACH}$ represents a frequency location of a common start subcarrier of an NPRACH, and $N_{sc}^{NPRACH}$ represents a quantity of subcarriers used for random access.

It should be understood that regardless of the case 1 or the case 2, when the terminal device sends the random access preamble to the network device, the six symbol groups or the five symbol groups of the random access preamble may be consecutive or inconsecutive in time. This is not limited in this embodiment of this application.

It should be further understood that in this embodiment of this application, the terminal device may repeatedly send the random access preamble to the network device based on a configured quantity of repetitions, or repeatedly send the random access preamble to the network device in another quantity of repetitions. For example, the random access preamble is repeated only once in each transmission in other words, only the six or five symbol groups are sent.

It should be noted that regardless of the case 1 or the case 2, when the terminal device needs to repeatedly send the random access preamble to the network device based on the configured quantity of repetitions, duplicates of the random access preamble in different repetitions may be consecutive or inconsecutive in time. This is not limited in this embodiment of this application.

Figure 5:
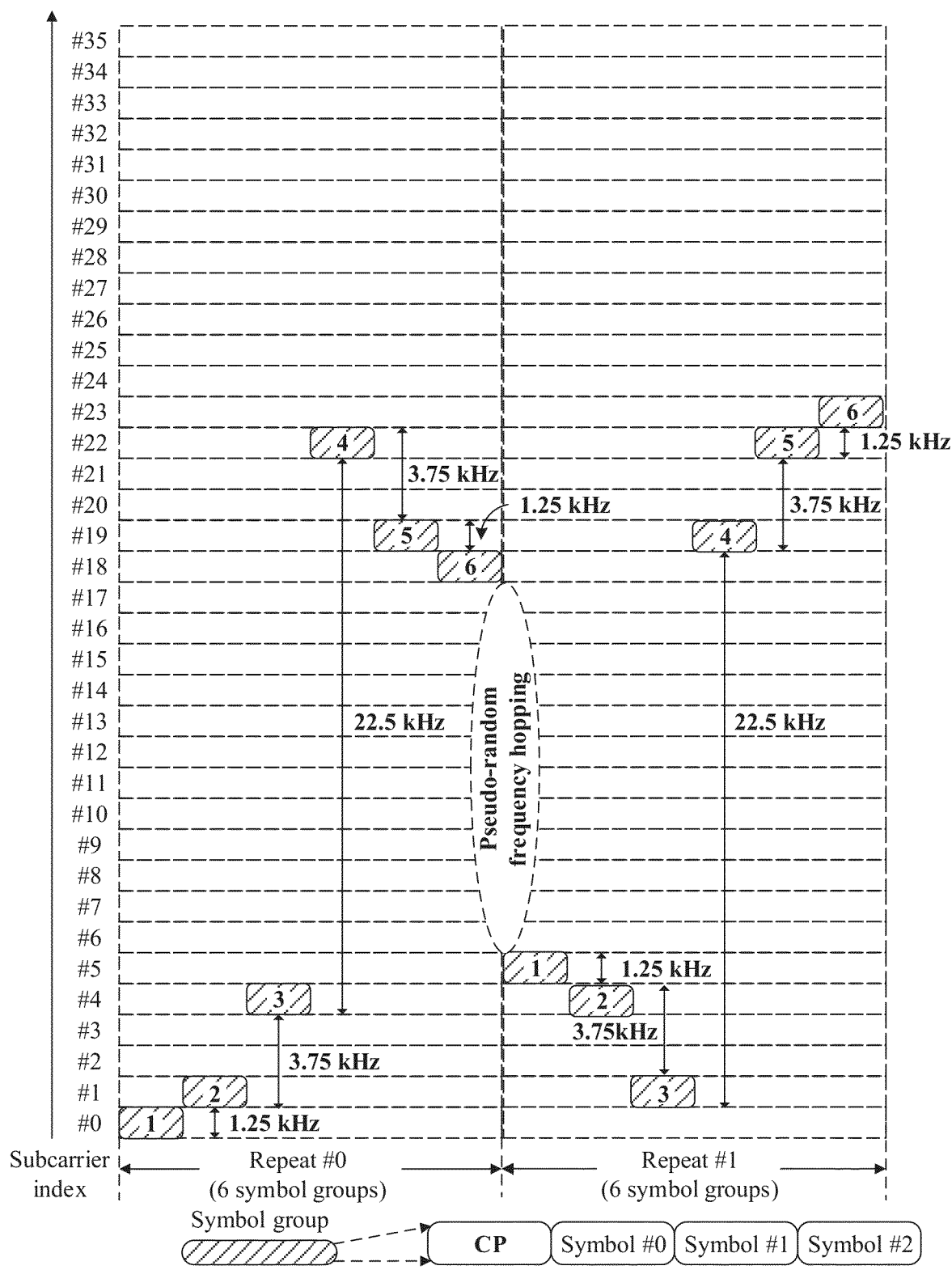
FIG. 5 shows a format and a frequency hopping pattern of a random access preamble according to an embodiment of this application.

The following describes a frequency hopping pattern of a random access preamble with reference to FIG. 5. In FIG. 5, W=2. In other words, a quantity of repetitions of the random access preamble is 2 (namely, #0 and #1 are repeated). Pseudo-random frequency hopping is used between the repetition #0 and the repetition #1 (as signed in a dashed ellipse in FIG. 5). A pseudo-random frequency hopping range is limited to 36 subcarriers.

As shown in FIG. 5, the random access preamble includes six symbol groups: a symbol group 1, a symbol group 2, a symbol group 3, a symbol group 4, a symbol group 5, and a symbol group 6. Each symbol group includes one CP, a symbol #0, a symbol #1, and a symbol #2, #0 to #35 indicate the 36 subcarriers frequency hopping interval between the symbol group 1 and the symbol group 2 is 1.25 kHz. A frequency hopping interval between the symbol group 2 and the symbol group 3 is 3.75 kHz. A frequency hopping interval between the symbol group 3 and the symbol group 4 is 22.5 kHz. A frequency hopping interval between the symbol group 4 and the symbol group 5 is 3.75 kHz. A frequency hopping interval between the symbol group 5 and the symbol group 6 is 1.25 kHz, A frequency hopping direction from the symbol group 1 to the symbol group 2 is opposite to a frequency hopping direction from the symbol group 5 to the symbol group 6, and a frequency hopping direction form the symbol group 2 to the symbol group 3 is opposite to a frequency hopping direction from the symbol group 4 to the symbol group 5.

It should be understood that the symbol group 1 to the symbol group 6 may respectively correspond to the foregoing first symbol group to the foregoing sixth symbol group.

Through simulation, when the random access preamble is sent based on the frequency hopping pattern shown in FIG. 5, a sequence correlation is comparatively good, and accuracy of estimated uplink timing can be improved. In addition, an existing random access preamble may be used for frequency hopping in 12 subcarriers (namely, 45 kHz). When a subcarrier bandwidth is reduced from 3.75 kHz to 1.25 kHz in this embodiment of this application, on a basis that an NPRACH resource of 45 kHz is maintained, a frequency hopping range of the random access preamble in this embodiment of this application may be increased from 12 subcarriers to 36 subcarriers. Therefore, the frequency hopping pattern provided in FIG. 5 can support more users in reusing the NPRACH resource to perform random access. In other words, compared with an existing solution with 45 kHz supporting 12 users, this application can support reuse by 36 users.

The foregoing mainly describes the case in which the random access preamble includes the six symbol groups. The following describes the case in which the random access preamble includes the five symbol groups.

Case 2

In step S310, the random access preamble includes the five symbol groups.

Optionally, a format of the random access preamble may be the format shown in Table 2 above. In the format shown in Table 2, time lengths of both a CP and a symbol may be 800 μs.

A maximum cell radius is related to a guard time (GT). A longer guard time indicates a larger covered maximum cell radius. The guard time is related to the CP and a total length of symbols in the symbol group. In addition, the time length of the CP should cover the maximum cell radius. According to a formula S=V*T, V is a speed of light of $3.0*10^8$ m/s, and $S=2*100*10^3$ m. Therefore, T=666.7 μs may be obtained by substituting the two values into the formula. S=V*T. However, the time length $T_{CP}$ of the CP is 800 μs, and is greater than 666.7 μs. Therefore, in this application, a format of the random access preamble is set, so that the random access preamble can support the larger cell radius, which is approximately 100 km.

It should be understood that the format of the random access preamble shown in Table 2 is merely an example for description. The format of the random access preamble is not specifically limited in this application. For example, each symbol group may also include one CP and four symbols. Alternatively, the time length of the symbol may be 700 μs, or the like.

It should be further understood that a format index of the random access preamble shown in Table 2 and a correspondence between a format index and a specific format are merely examples for description, and do not constitute any limitation on this application. For example, in a random access preamble whose format index is 2, any symbol group may include one CP and two symbols. For another example, any symbol group of one random access preamble includes one CP and three symbols, and a format index of the random access preamble is 0.

Further, sequences carried in any two symbol groups may be the same, or may be different. The random access preamble may be a random access preamble that is not scrambled by using a scrambling sequence, or may be a random access preamble that is scrambled by using a scrambling sequence. This is not limited in this embodiment of this application. For details, refer to the foregoing description. For brevity, details are not described herein again.

Optionally, in an embodiment of this application, the terminal device may determine the random access preamble based on the random access configuration information sent by the network device in step S302.

For how the terminal device determines the random access preamble based on the random access configuration information sent by the network device, refer to the foregoing descriptions. For a parameter carried in the random access configuration information, a sending manner of the random access configuration information, and the like, refer to the foregoing descriptions. For brevity, details are not described herein again.

In step S320, the five symbol groups included in the random access preamble are denoted as a first symbol group, a second symbol group, a third symbol group, a fourth symbol group, and a fifth symbol group in a time sequence. A frequency hopping interval between the second symbol group and the third symbol group and a frequency hopping interval between the fourth symbol group and the fifth symbol group are equal and both are first intervals. A frequency hopping interval between the first symbol group and the second symbol group is a second interval. A frequency hopping interval between the third symbol group and the fourth symbol group is a third interval. The first interval, the second interval, and the third interval are unequal and are not equal to zero.

Herein, for a definition or a meaning of the frequency hopping interval, refer to the description in case 1. Details are not described herein again.

For example, a frequency hopping interval between adjacent symbol groups may be an integer multiple of the subcarrier bandwidth. For example, the subcarrier bandwidth is 1.25 kHz, and the frequency hopping interval between the adjacent symbol groups may be N*1.25 kHz, where N is a positive integer. Alternatively, the frequency hopping interval between the adjacent symbol groups may not be the integer multiple of the subcarrier bandwidth. Whether the frequency hopping interval between the adjacent symbol groups is the integer multiple of the subcarrier bandwidth is not limited in this embodiment of this application.

Optionally, the second interval may be less than the first interval, and the first interval may be less than the third interval.

It should be understood that a limitation on a value relationship among the first interval, the second interval and the third interval is merely an example for description, and shall not constitute any limitation on this application. For example, the first interval may be greater than the second interval, and the second interval may be greater than the third interval.

Optionally, the second interval may be 1.25 kHz.
Optionally, the first interval may be 3.75 kHz.
Optionally, the third interval may be 22.5 kHz.

It should be understood that values of the first interval, the second interval, and the third interval are not specifically limited in this embodiment of this application. The embodiment is merely an example for description, and shall not constitute any limitation on this application. For example, the first interval may alternatively be 2.5 kHz, and the second interval may alternatively be 3.25 kHz. For another example, the third interval may be 12.5 kHz.

Further, a frequency hopping direction from the second symbol group to the third symbol group is opposite to a frequency hopping direction from the fourth symbol group to the fifth symbol group.

In other words, if a frequency of the second symbol group is less than a frequency of the third symbol group, a frequency of the fourth symbol group is greater than a frequency of the fifth symbol group. If the frequency of the second symbol group is greater than the frequency of the third symbol group, the frequency of the fourth symbol group is less than the frequency of the fifth symbol group.

According to the communication method in this embodiment of this application, the terminal device determines a frequency hopping pattern (namely, a frequency location of each symbol group) of the random access preamble including die five symbol groups, to send the random access preamble and perform random access.

Figure 6:
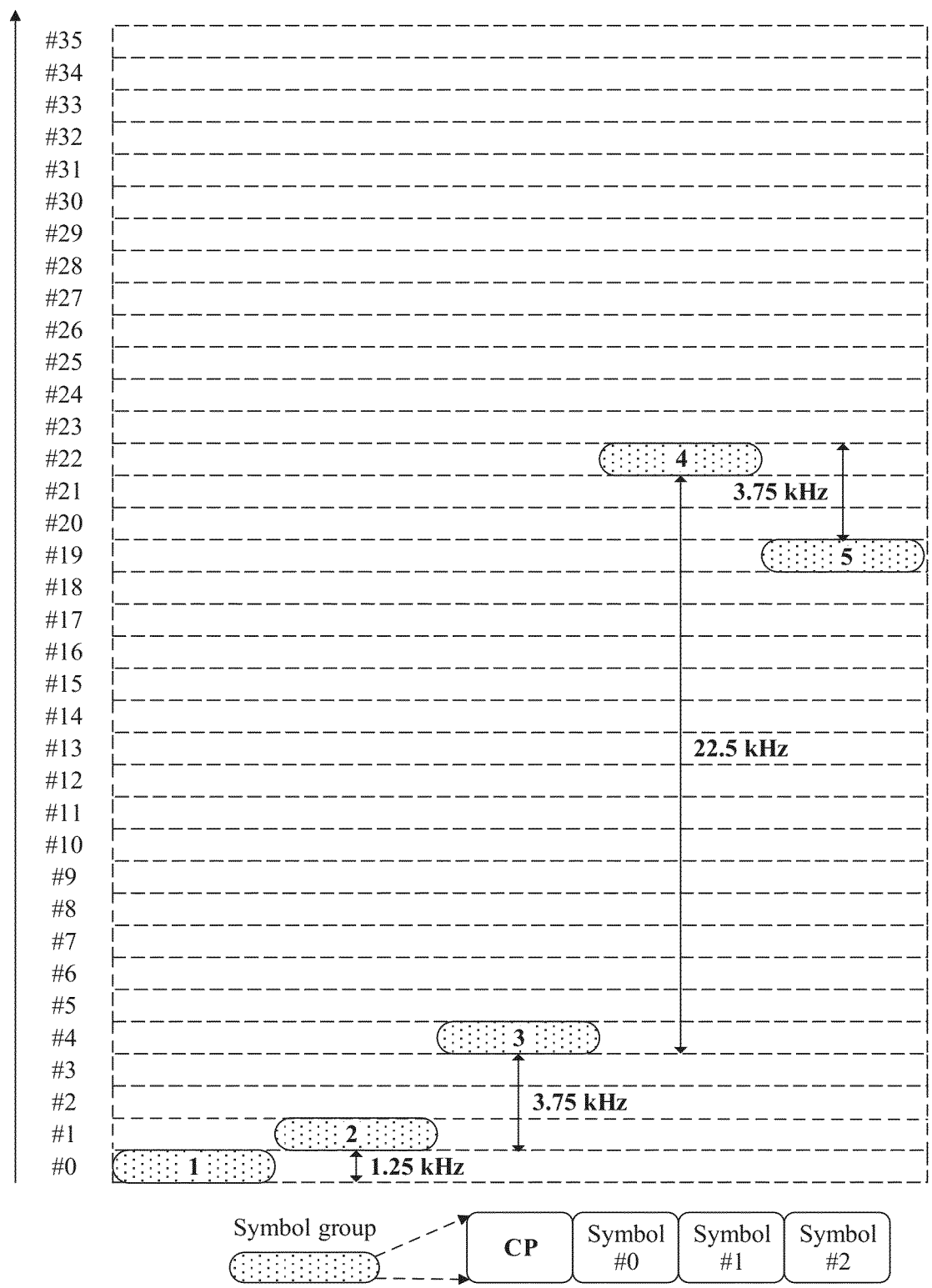
FIG. 6 shows a format and a frequency hopping pattern of a random access preamble according to an embodiment of this application.

The following describes a frequency hopping pattern of a random access preamble with reference to FIG. 6.

As shown in FIG. 6, the random access preamble includes five symbol groups: a symbol group 1, a symbol group 2, a symbol group 3, a symbol group 4, and a symbol group 5. Each symbol group includes one CP, a symbol #0, a symbol #1, and a symbol #2, #0 to #35 indicate 36 subcarriers. A frequency hopping interval between the symbol group 1 and the symbol group 2 is 1.25 kHz. A frequency hopping interval between the symbol group 2 and the symbol group 3 is 3.75 kHz. A frequency hopping interval between the symbol group 3 and the symbol group 4 is 22.5 kHz. A frequency hopping interval between the symbol group 4 and the symbol group 5 is 3.75 kHz. A frequency hopping direction from the symbol group 2 to the symbol group 3 is opposite to a frequency hopping direction from the symbol group 4 to the symbol group 5.

It should be understood that the symbol group 1 to the symbol group 5 may respectively correspond to the foregoing first symbol group to the foregoing fifth symbol group.

Through simulation, when the random access preamble is sent based on the frequency hopping pattern shown in FIG. 6, a sequence correlation is comparatively good, and accuracy of estimated uplink timing can be improved. In addition, an existing random access preamble may be used for frequency hopping in 12 subcarriers (namely, 45 kHz). When a subcarrier bandwidth is reduced from 3.75 kHz to 1.25 kHz in this embodiment of this application, on a basis that an NPRACH resource of 45 kHz is maintained, a frequency hopping range of the random access preamble in this embodiment of this application may be increased from 12 subcarriers to 36 subcarriers. Therefore, the frequency hopping pattern provided in FIG. 6 can support more users in reusing the NPRACH resource to perform random access. In other words, compared with an existing solution with 45 kHz supporting 12 users, this application can support reuse by 36 users.

Optionally, in a specific implementation of step S320, the terminal device may determine the frequency location of the random access preamble based on the random access configuration information and a preset rule.

For example, the random access configuration information may include a quantity W of repetitions of the random access preamble. 5*W symbol groups included in the random access preamble in the W repetitions are numbered 0, 1, ..., i, ..., 5W−2, and 5W−1 in a time sequence, and W is a positive integer. It should be understood that a number i of the 5*W symbol groups is greater than or equal to 0, and is less than or equal to 5W−1. For example, if W=2, the 10 symbol groups included in the random access preamble in the two repetitions are respectively numbered 0, 1, 2, 3, 4, 5, 6, 7, 8, and 9 in the time sequence. It should be understood that when W=2, the terminal device sends 10 symbol groups in step S330. The random access configuration information may further be used to determine a frequency location of a symbol group whose number is 0.

The preset rule includes a first formula and a second formula. The first formula and the second formula may be used to calculate a frequency location of each symbol group. The first formula and a number i of a symbol group P are used to determine a frequency location of the symbol group P. The second formula and a number i of a symbol group Q are used to determine a frequency location of the symbol group Q. The symbol group P is a symbol group whose number satisfies i>0 and imod5=0 in the 5*W symbol groups. The symbol group Q is a symbol group whose number satisfies i>0 and imod5≠0 in the 5*W symbol groups. Alternatively, the symbol group P is a symbol group whose number is i in the 5*W symbol groups, where i satisfies i>0 and imod5=0, where mod represents a modulo operation. The symbol group Q is a symbol group other than the symbol group whose number is 0 and the symbol group P in the 5*W symbol groups. For example, if W=2, after being repeated twice, the random access preamble includes 10 symbol groups in total, the symbol group P is the symbol group whose number is 5 in the 10 symbol groups, and the symbol group Q is a symbol group whose number is 1, 2, 3, 4, 6, 7, 8, or 9 in the 10 symbol groups.

The preset rule may be, for example, specified in a protocol, or may be configured by the network device. This is not limited in this embodiment of this application.

In other words, the terminal device determines the frequency location of the symbol group whose number is 0 based on the random access configuration information, determines the frequency location of the symbol group P based on the first formula and the number i of the symbol group P, and determines the frequency location of the symbol group Q based on the second formula and the number i of the symbol group Q.

For another example, the random access configuration information may further include a quantity W of repetitions, a frequency location of each symbol group in a first repetition, and a frequency hopping interval between a first symbol group in a next repetition and a fifth symbol group in a previous repetition. Based on the information, the terminal device may determine the frequency location of each symbol group in each repetition period in the W repetitions.

In this application, the terminal device may alternatively determine the frequency location of the random access preamble based on only the random access configuration information. For example, the random access configuration information may include the frequency location of each of the 5*W symbol groups. It should be understood that a manner in which the terminal device determines the frequency location of the random access preamble is not limited in this embodiment of this application.

In an example of the first formula, the first formula is related to the frequency location of the symbol group whose number is 0 and a function determined based on a number i and a pseudo-random sequence, or the first formula is related to a frequency location of a symbol group whose number is i−5 and a function determined based on the number i and a pseudo-random sequence, and the number i is a number of the symbol group P.

In other words, the symbol group P may be determined based on the frequency location of the symbol group whose number is 0, and the function determined by the number i of the symbol group P and the pseudo-random sequence. Alternatively, the symbol group P may be determined based on the frequency location of the symbol group whose number is i−5, and the function determined by the number i of the symbol group P and the pseudo-random sequence. It can be learned that the frequency location of the symbol group P is related to the frequency location of the symbol group whose number is 0, or is related to a frequency location of a fifth symbol group before the symbol group P, and is irrelevant to a frequency location of another symbol group.

In an example of the second formula, the second formula is related to a frequency location of a symbol group whose number is i−1 and a frequency location interval and a frequency hopping direction of a symbol group whose number is i relative to the symbol group whose number is i−1; and the number i is a number of the symbol group Q.

In other words, the frequency location of the symbol group Q may be determined based on the frequency location of a previous symbol group whose number is i−1 and that is adjacent to the symbol group Q a frequency hopping interval and a frequency hopping direction of the symbol group Q relative to the previous symbol group adjacent to the symbol group Q. It can be learned that the frequency location of the symbol group Q is related only to the frequency location of the previous symbol group adjacent to the symbol group Q, and is irrelevant to a frequency location of another symbol group.

Optionally, the preset rule may include a formula 3 or a formula 4,
the formula 3 is:

$$\tilde{n}_{sc}^{RA}(i) = \begin{cases} (\tilde{n}_{sc}^{RA}(0) + f(i/5)) \bmod N_{sc}^{RA} & i \bmod 5 = 0 \text{ and } i > 0 \\ \tilde{n}_{sc}^{RA}(i-1) + 1 & i \bmod 5 = 1 \text{ and } \tilde{n}_{sc}^{RA}(i-1) \bmod 2 = 0 \\ \tilde{n}_{sc}^{RA}(i-1) - 1 & i \bmod 5 = 1 \text{ and } \tilde{n}_{sc}^{RA}(i-1) \bmod 2 = 1 \\ \tilde{n}_{sc}^{RA}(i-1) + 3 & i \bmod 5 = 2, 4 \text{ and } \lfloor \tilde{n}_{sc}^{RA}(i-1)/3 \rfloor \bmod 2 = 0 \\ \tilde{n}_{sc}^{RA}(i-1) - 3 & i \bmod 5 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i \bmod 5 = 3 \text{ and } \tilde{n}_{sc}^{RA}(i-1) < 18 \\ \tilde{n}_{sc}^{RA}(i-1) - 18 & i \bmod 5 = 3 \text{ and } \tilde{n}_{sc}^{RA}(i-1) \geq 18 \end{cases} ;$$

and
the formula 4 is:

$$\tilde{n}_{sc}^{RA}(i) = \begin{cases} (\tilde{n}_{sc}^{RA}(i-5) + f(i/5)) \bmod N_{sc}^{RA} & i \bmod 5 = 0 \text{ and } i > 0 \\ \tilde{n}_{sc}^{RA}(i-1) + 1 & i \bmod 5 = 1 \text{ and } \tilde{n}_{sc}^{RA}(i-1) \bmod 2 = 0 \\ \tilde{n}_{sc}^{RA}(i-1) - 1 & i \bmod 5 = 1 \text{ and } \tilde{n}_{sc}^{RA}(i-1) \bmod 2 = 1 \\ \tilde{n}_{sc}^{RA}(i-1) + 3 & i \bmod 5 = 2, 4 \text{ and } \lfloor \tilde{n}_{sc}^{RA}(i-1)/3 \rfloor \bmod 2 = 0 \\ \tilde{n}_{sc}^{RA}(i-1) - 3 & i \bmod 5 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i \bmod 5 = 3 \text{ and } \tilde{n}_{sc}^{RA}(i-1) < 18 \\ \tilde{n}_{sc}^{RA}(i-1) - 18 & i \bmod 5 = 3 \text{ and } \tilde{n}_{sc}^{RA}(i-1) \geq 18 \end{cases}$$

where $\tilde{n}_{sc}^{RA}(i)$ is a frequency location of the symbol group whose number is i, $f(i/5)$ is a function determined based on the number i of the symbol group, $N_{sc}^{RA}$, and a pseudo-random sequence. $N_{sc}^{RA}$ is a transmission limitation on a random access preamble, $\lfloor \ \rfloor$ represents rounding down, $N_{sc}^{RA} > 0$, and $\tilde{n}_{sc}^{RA}(i) \geq 0$.

Herein, $N_{sc}^{RA}$ may be specified in a protocol, may be notified by the network device to the terminal device, may be a fixed value, or may be one of some candidate values. For example, the network device may use the random access configuration information to carry $N_{sc}^{RA}$. When the subcarrier bandwidth is 1.25 kHz, $N_{sc}^{RA}$ may be equal to 36. This is not limited herein. For example, $N_{sc}^{RA}$ may alternatively be 72. A value of $N_{sc}^{RA}$ may be equal to $N_{sc}^{NPRACH}$ or a value of $N_{sc}^{RA}$ may be associated with or bound to $N_{sc}^{NPRACH}$. For example, $N_{sc}^{RA}$ is associated with $N_{sc}^{NPRACH}$ by using some correspondences in a table. This is not limited herein. $N_{sc}^{NPRACH}$ is a parameter in the random access configuration information sent by the network device to the terminal device, and represents a quantity of subcarriers used for random access.

It should be understood that a first row in the formula 3 or the formula 4 may be the foregoing first formula, and a second row to a seventh row in the formula 3 or the formula 4 may be the foregoing second formula. It should be further understood that, the frequency hopping interval and the frequency hopping direction of the symbol group whose number is i relative to the symbol group whose number is i−1 may be determined according to the formula in the second row to the seventh row. For example, the second row in the formula 1 or the formula 2 is used as an example. $\tilde{n}_{sc}^{RA}(i-1)$ is the frequency location of the symbol group whose number is i−1. The following "+1" represents that the frequency location of the symbol group whose number is i is greater than the frequency location of the symbol group whose number is i−1, and the frequency hopping interval between the symbol group whose number is i and the symbol group whose number is i−1 is one subcarrier. According to a recurrence relationship, as long as a frequency location of the first symbol group is determined, the frequency location of each symbol group after the first symbol group may be determined based on the frequency hopping interval and the frequency hopping direction of the symbol group whose number is i relative to the symbol group whose number is i−1.

In an example, in this embodiment of this application, the frequency location of the symbol group whose number is 0 is $\tilde{n}_{sc}^{RA}(0) = n_{init} \bmod N_{sc}^{RA}$, where $n_{init}$ is an index of a subcarrier selected from $\{0, 1, \ldots, N_{sc}^{NPRACH}-1\}$ at a MAC layer, and $N_{sc}^{NPRACH}$ represents a quantity of subcarriers used for random access.

For example, in this embodiment of this application, a value of $f(i/5)$ may be determined based on a function $f(t)$ of the pseudo-random sequence c(n) $f(t)$ may be expressed as $$f(t) = \left( f(t+1) + \left( \sum_{n=10t+1}^{10t+9} c(n) 2^{n-(10t+1)} \right) \bmod(N_{sc}^{RA}-1) + 1 \right) \bmod N_{sc}^{RA},$$

where
$f(-1)=0$, and c(n) may be an m-sequence, an M-sequence, a Gold sequence, or the like. This is not limited in this embodiment of this application. Further, an initialization seed of c(n) may be a physical-layer cell identifier of the terminal device, or a function of a physical-layer cell identifier.

For example, c(n) may represent a Gold sequence with a length of 31. A length of the Gold sequence is denoted as $M_{PN}$, n=0, 1, ..., $M_{PN}$−1 and c(n) may be expressed as:

$$c(n)=x(n+N_C)+x_2(n+N_C)) \bmod 2,$$

$$x_1(n+31)=(x_1(n+3)+x_1(n)) \bmod 2,$$

$$x_2(n+31)=(x_2(n+3)+x_2(n+2)+x_2(n+1)+x_2(n)) \bmod 2,$$

where $N_C$=600. An initialization seed of a first m-sequence satisfies $x_1(0)=1(n)=0$, n=1, 2, ..., 30, and an initialization seed of a second m-sequence is expressed as $c_{init}=\Sigma_{k=0}^{30} x_2(k) \cdot 2^k$. $c_{init}=N_{ID}^{Ncell}$, where $N_{ID}^{Ncell}$ is a physical-layer cell identifier.

It should be noted that the foregoing expression is merely an example. A specific representation form of an index expression is not limited in this application, and a representation in another form also falls within the protection scope of this application.

It should be understood that the formula 3 and the formula 4 and examples related to the formula 3 and the formula 4 are all applicable to the following configurations: The subcarrier bandwidth is configured as 1.25 kHz, transmission of the random access preamble is limited to $N_{sc}^{RA}$=36 subcarriers, and a frequency hopping range between symbol groups is within 36 subcarriers. The formula 3 and the formula 4, and the examples related to the formula 3 and the formula 4 are further applicable to another configuration. This is not specifically limited in this embodiment of this application.

It should be further understood that the foregoing uses only an example in which the pseudo-random frequency hopping is used as the frequency hopping interval of the random access preamble in different repetitions, but this should not constitute any limitation on this application. In this application, the pseudo-random frequency hopping may not be used in the random access preamble in the different repetitions. For example, frequency locations of first symbol groups in five symbol groups included in the random access preamble in any two repetitions may be the same.

Figure 7:
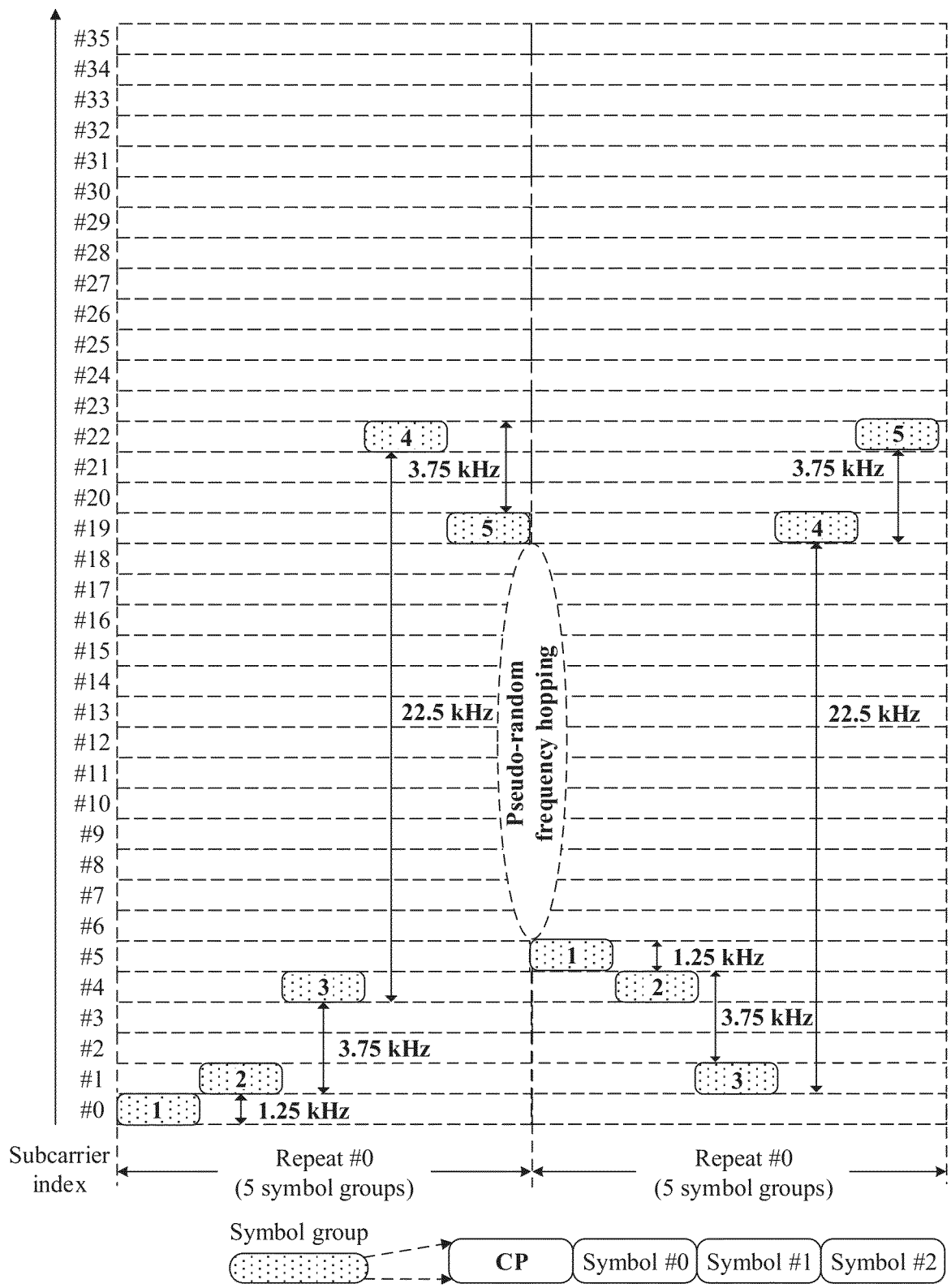
FIG. 7 shows a format and a frequency hopping pattern of a random access preamble according to an embodiment of this application.

The following describes a frequency hopping pattern of a random access preamble with reference to FIG. 7. In FIG. 7, W=2. In other words, a quantity of repetitions of the random access preamble is 2 (namely, #0 and #1 are repeated). Pseudo-random frequency hopping is used between the repetition #0 and the repetition #1 (as signed in a dashed ellipse in FIG. 7). A pseudo-random frequency hopping range is limited to 36 subcarriers.

As shown in FIG. 7, the random access preamble includes five symbol groups: a symbol group 1, a symbol group 2, a symbol group 3, a symbol group 4, and a symbol group 5. Each symbol group includes one CP, a symbol #0, a symbol #1, and a symbol #2. #0 to #35 indicate the 36 subcarriers. A frequency hopping interval between the symbol group 1 and the symbol group 2 is 1.25 kHz. A frequency hopping interval between the symbol group 2 and the symbol group 3 is 3.75 kHz. A frequency hopping interval between the symbol group 3 and the symbol group 4 is 22.5 kHz, A frequency hopping interval between the symbol group 4 and the symbol group 5 is 3.75 kHz. A frequency hopping direction from the symbol group 2 to the symbol group 3 is opposite to a frequency hopping direction from the symbol group 4 to the symbol group 5.

It should be understood that the symbol group 1 to the symbol group 5 may respectively correspond to the foregoing first symbol group to the foregoing fifth symbol group.

Through simulation, when the random access preamble is sent based on the frequency hopping pattern shown in FIG. 7, a sequence correlation is comparatively good, and accuracy of estimated uplink timing can be improved. In addition, an existing random access preamble may be used for frequency hopping in 12 subcarriers (namely, 45 kHz). When a subcarrier bandwidth is reduced from 3.75 kHz to 1.25 kHz in this embodiment of this application, on a basis that an NPRACH resource of 45 kHz is maintained, a frequency hopping range of the random access preamble in this embodiment of this application may be increased from 12 subcarriers to 36 subcarriers. Therefore, the frequency hopping pattern provided in FIG. 7 can support more users in reusing the NPRACH resource to perform random access. In other words, compared with an existing solution with 45 kHz supporting 12 users, this application can support reuse by 36 users.

For a meaning of the "frequency location" in this embodiment of this application and descriptions and examples of the absolute frequency location and the relative frequency location, refer to the foregoing descriptions. For brevity, details are not described herein again.

The method provided in the embodiments of this application is described above in detail with reference to FIG. 3 to FIG. 7. An apparatus provided in the embodiments of this application is described below in detail with reference to FIG. 8 to FIG. 11.

Figure 8:
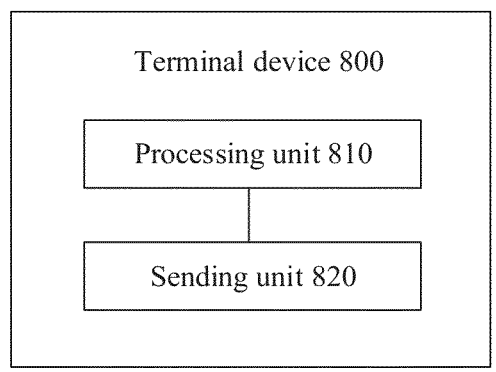
FIG. 8 is a schematic block diagram of a communications device according to an embodiment of this application.

FIG. 8 is a schematic block diagram of a terminal device 800 according to an embodiment of this application. As shown in FIG. 8, the terminal device 800 may include a processing unit 810 and a sending unit 820.

The processing unit 810 is configured to determine a random access preamble.

The processing unit 810 is further configured to determine a frequency location of the random access preamble based on random access configuration information and a preset rule.

The sending unit 820 is configured to send the random access preamble to a network device based on the frequency location.

The random access preamble includes six symbol groups. The six symbol groups include a first symbol group, a second symbol group, a third symbol group, a fourth symbol group, a fifth symbol group, and a sixth symbol group; A frequency interval between every two adjacent symbol groups in the six symbol groups is a frequency hopping interval. A frequency hopping interval between the first symbol group and the second symbol group and a frequency hopping interval between the fifth symbol group and the sixth symbol group are equal and both are first intervals. A frequency hopping interval between the second symbol group and the third symbol group and a frequency hopping interval between the fourth symbol group and the fifth symbol group are equal and both are second intervals. A frequency hopping interval between the third symbol group and the fourth symbol group is a third interval. The first interval, the second interval, and the third interval are unequal and are not equal to zero.

Alternatively, the random access preamble includes five symbol groups. The five symbol groups include a first symbol group, a second symbol group, a third symbol group, a fourth symbol group, and a fifth symbol group. A frequency hopping interval between the second symbol group and the third symbol group and a frequency hopping interval between the fourth symbol group and the fifth symbol group are equal and both are first intervals. A frequency hopping interval between the first symbol group and the second symbol group is a second interval. A frequency hopping interval between the third symbol group and the fourth symbol group is a third interval. The first interval, the second interval, and the third interval are unequal and are not equal to zero.

It should be understood that the terminal device 800 may correspond to the terminal device in the communication method 300 according to the embodiments of this application. The terminal device 800 may include a unit configured to perform the method performed by the terminal device in the communication method 300 in FIG. 3, In addition, the units in the terminal device 800 and the foregoing other operations and/or functions are separately used to implement a corresponding procedure of the communication method 300 in FIG. 3. A specific process in which the units perform the foregoing corresponding steps is described in detail in the communication method 300. For brevity, details are not described herein again.

Figure 9:
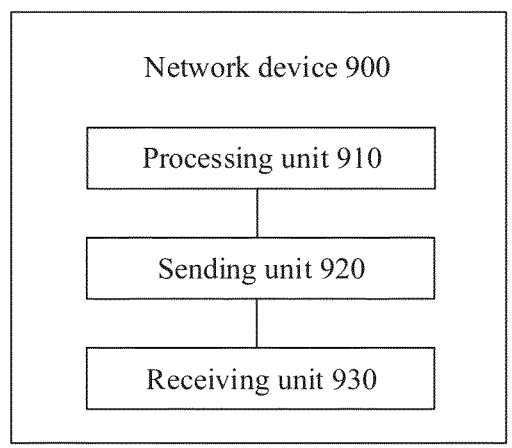
FIG. 9 is a schematic block diagram of a network device according to an embodiment of this application.

FIG. 9 is a schematic block diagram of a network device 900 according to an embodiment of this application. As shown in FIG. 9, the network device 900 may include a processing unit 910, a sending unit 920, and a receiving unit 930.

The processing unit 910 is configured to determine random access configuration information, and send the random access configuration information to a terminal device by using the sending unit 920. The random access configuration information is used to indicate to the terminal device to determine a random access preamble.

The receiving unit 930 is configured to receive the random access preamble that is sent by the terminal device based on the random access configuration information. The random access preamble is sent by the terminal device based on a determined frequency location. The frequency location is determined based on the random access configuration information and a preset rule.

The random access preamble includes six symbol groups. The six symbol groups include a first symbol group, a second symbol group, a third symbol group, a fourth symbol group, a fifth symbol group, and a sixth symbol group. A frequency interval between every two adjacent symbol groups in the six symbol groups is a frequency hopping interval. A frequency hopping interval between the first symbol group and the second symbol group and a frequency hopping interval between the fifth symbol group and the sixth symbol group are equal and both are first intervals. A frequency hopping interval between the second symbol group and the third symbol group and a frequency hopping interval between the fourth symbol group and the fifth symbol group are equal and both are second intervals. A frequency hopping interval between the third symbol group and the fourth symbol group is a third interval. The first interval, the second interval, and the third interval are unequal and are not equal to zero.

Alternatively, the random access preamble includes five symbol groups. The five symbol groups include a first symbol group, a second symbol group, a third symbol group, a fourth symbol group, and a fifth symbol group. A frequency hopping interval between the second symbol group and the third symbol group and a frequency hopping interval between the fourth symbol group and the fifth symbol group are equal and both are first intervals. A frequency hopping interval between the first symbol group and the second symbol group is a second interval. A frequency hopping interval between the third symbol group and the fourth symbol group is a third interval. The first interval, the second interval, and the third interval are unequal and are not equal to zero.

It should be understood that the network device 900 may correspond to the network device in the communication method 300 according to the embodiments of this application. The network device 900 may include a module configured to perform the method performed by the network device in the communication method 300 in FIG. 3. In addition, the modules in the network device 900 and the foregoing other operations and/or functions are separately used to implement a corresponding procedure of the communication method 300 in FIG. 3. A specific process in which the modules perform the foregoing corresponding steps is described in detail in the communication method 300. For brevity, details are not described herein again.

Figure 10:
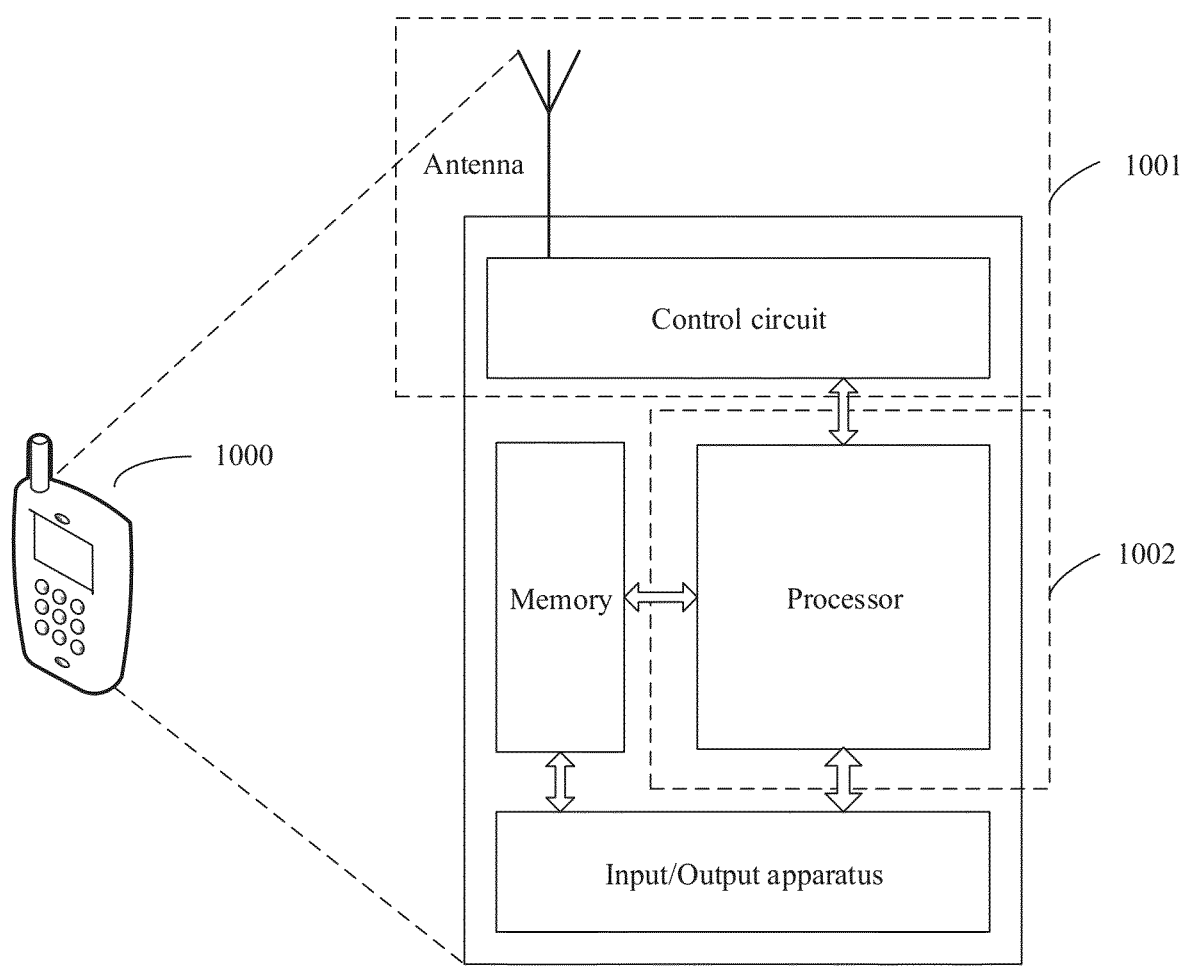
FIG. 10 is a schematic structural diagram of another terminal device according to an embodiment of this application.

FIG. 10 is a schematic structural diagram of a terminal device 1000 according to an embodiment of this application. The terminal device 1000 is applicable to the system shown in FIG. 1, and performs a function of the terminal device in the method embodiment. The terminal device 1000 may be a specific implementation of the terminal device 800 shown in FIG. 8. For ease of description, FIG. 10 shows only main components of the terminal device. As shown in FIG. 10, the terminal device 1000 includes a processor, a memory, a control circuit, an antenna, and an input/output apparatus. The processor is mainly configured to process a communications protocol and communication data, control the entire terminal device, execute a software program, and process data of the software program. For example, the processor is configured to support the terminal device in performing actions described in the method embodiments, for example, determining the random access preamble and the frequency location of the random access preamble. The memory is mainly configured to store the software program and the data, for example, store the preset rule described in the embodiments. The control circuit is mainly configured to perform conversion between a baseband signal and a radio frequency signal, and process the radio frequency signal. A combination of the control circuit and the antenna may also be referred to as a transceiver that is mainly configured to receive and transmit a radio frequency signal in an electromagnetic wave form. The input/output apparatus such as a touchscreen, a display, or a keyboard is mainly configured to receive data entered by a user and output data to the user.

After the terminal device is powered on, the processor may read the software program in a storage unit, explain and execute an instruction of the software program, and process the data of the software program. When data needs to be sent in a wireless manner, the processor performs baseband processing on the to-be-sent data, and then outputs a baseband signal to a radio frequency circuit. After performing radio frequency processing on the baseband signal, the radio frequency circuit sends a radio frequency signal through the antenna in the electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 10 shows only one memory and only one processor. An actual terminal device may have a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communications protocol and communication data. The central processing unit is mainly configured to control the entire terminal device, execute a software program, and process data of the software program. Functions of the baseband processor and the central processing unit may be integrated into the processor in FIG. 10. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip function of processing the communications protocol and the communication data may be built in the processor, or may be stored in the storage unit in a form of the software program. The processor executes the software program to implement a baseband processing function.

In this embodiment of this application, the antenna and the control circuit that have a transceiver function may be considered as a transceiver unit 1001 of the terminal device 1000, for example, the transceiver unit 1001 is configured to support the terminal device 1000 in performing the receiving function and the sending function described in FIG. 3. The processor having a processing function is considered as a processing unit 1002 of the terminal device 1000. As shown in FIG. 10, the terminal device 1000 includes the transceiver unit 1001 and the processing unit 1002. The transceiver unit 1001 may also be referred to as a transceiver, a transceiver machine, a transceiver apparatus, or the like. Optionally, a device configured to implement a receiving function in the transceiver unit 1001 may be considered as a receiving unit. A device configured to implement a sending function in the transceiver unit 1001 may be considered as a sending unit. In other words, the transceiver unit 1001 includes the receiving unit and the sending unit. The receiving unit may also be referred to as a receiving machine, an input port, a receiving circuit, or the like. The sending unit may be referred to as a transmitting machine, a transmitter, a transmitting circuit, or the like.

The processing unit 1002 may be configured to execute an instruction stored in the memory, to control the transceiver unit 1001 to receive a signal and/or send a signal, to complete a function of the terminal device 1000 in the method embodiment. In an implementation, it may be considered that a function of the transceiver unit 1001 is implemented by using a transceiver circuit or a transceiver-dedicated chip.

Figure 11:
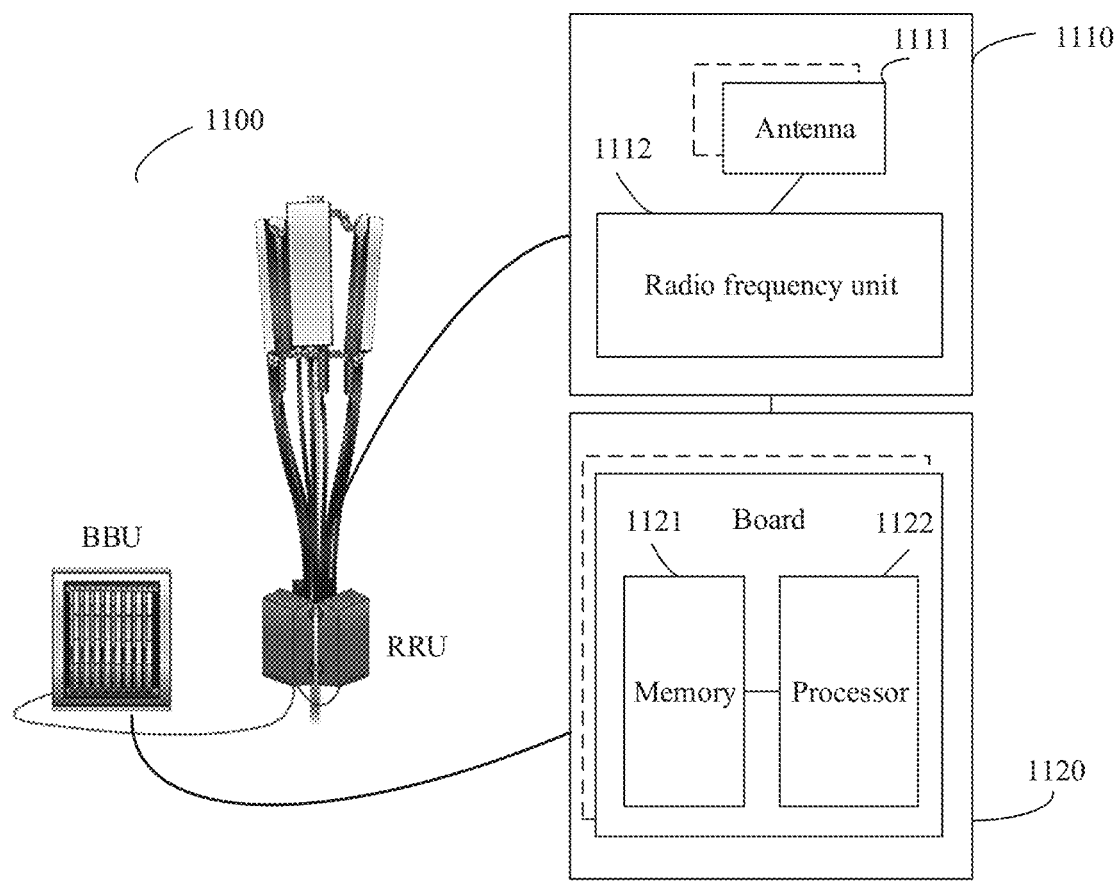
FIG. 11 is a schematic structural diagram of another network device according to an embodiment of this application.

FIG. 11 is a schematic structural diagram of a network device according to an embodiment of this application. For example, FIG. 11 may be a schematic structural diagram of a base station. As shown in FIG. 11, the base station is applicable to the system shown in FIG. 1, and performs a function of the network device in the method embodiment. The base station 1100 may include one or more radio frequency units such as a remote radio unit (RRU) 1110 and one or more baseband units (BBU) (which may also be referred to as digital units, digital unit, DU) 1120. The RRU 1110 may be referred to as a transceiver unit, a transceiver machine, a transceiver circuit, a transceiver, or the like, and may include at least one antenna 1111 and a radio frequency unit 1112. The RRU 1110 is mainly configured to receive and send a radio frequency signal and perform a conversion between the radio frequency signal and a baseband signal. The BBU 1120 is mainly configured to perform baseband processing, control the base station, and so on. The RRU 1110 and the BBU 1120 may be physically disposed together, or may be physically separated, namely, in a distributed base station.

The BBU 1120 is a control center of the base station, may also be referred to as a processing unit, and is mainly configured to complete baseband processing functions, for example, channel coding, multiplexing, modulation, and spreading. For example, the BBU (the processing unit) 1120 may be configured to control the base station 1100 to perform an operation procedure related to the network device in the method embodiment.

In an example, the BBU 1120 may include one or more boards. A plurality of boards may jointly support a radio access network (such as an LTE network) of a single access standard, or may separately support radio access networks (such as an LTE network, a 5G network, or another network) of different access standards. The BBU 1120 further includes a memory 1121 and a processor 1122. The memory 1121 is configured to store a necessary instruction and necessary data. For example, the memory 1121 stores the preset rule in the foregoing embodiment. The processor 1122 is configured to control the base station to perform a necessary action. For example, the processor 1122 is configured to control the base station to perform the operation procedure related to the network device in the method embodiment. The memory 1121 and the processor 1122 may serve the one or more boards. In other words, a memory and a processor may be independently disposed on each board. Alternatively, the plurality of boards may share a same memory and a same processor. In addition, a necessary circuit may be disposed on each board.

This application further provides a communications system including the foregoing one or more network devices and one or more terminal devices.

It should be understood that, the processor in the embodiments of this application may be a central processing unit (CPU), or the processor may be another general purpose processor, a digital signal processor (DSP), an application-specific integrated circuit (ASIC), a field programmable gate array (FPGA), another programmable logic device, a discrete gate, a transistor logic device, a discrete hardware component, or the like. The general purpose processor may be a microprocessor, the processor may be any conventional processor, or the like.

It should be further understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of random access memories (RAM) may be used, for example, a static random access memory (static RAM, SRAM), a dynamic random access memory DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

All or some of the foregoing embodiments may be implemented by software, hardware, firmware, or any combination thereof. When software is used to implement the embodiments, all or some of the foregoing embodiments may be implemented in a form of a computer program product. The computer program product includes one or more computer instructions or computer programs. When the program instructions or the computer programs are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units, Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the related technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining, by a terminal device, a random access preamble, wherein the random access preamble comprises six symbol groups, and wherein the six symbol groups comprise a first symbol group, a second symbol group, a third symbol group, a fourth symbol group, a fifth symbol group, and a sixth symbol group;
   determining, by the terminal device, a frequency location of the random access preamble based on random access configuration information and a preset rule, wherein:

a frequency interval between every two adjacent symbol groups in the six symbol groups is a frequency hopping interval;

a frequency hopping interval between the first symbol group and the second symbol group and a frequency hopping interval between the fifth symbol group and the sixth symbol group are equal and both are first intervals;

a frequency hopping interval between the second symbol group and the third symbol group and a frequency hopping interval between the fourth symbol group and the fifth symbol group are equal and both are second intervals;

a frequency hopping interval between the third symbol group and the fourth symbol group is a third interval; and the first interval, the second interval, and the third interval are unequal and are not equal to zero; and sending, by the terminal device, the random access preamble to a network device based on the frequency location.

2. The method according to claim 1, wherein the random access configuration information comprises a quantity W of repetitions of the random access preamble, wherein 6*W symbol groups comprised in the random access preamble in the W repetitions are numbered 0, 1, ..., i, ..., 6W−2, and 6W−1 in a time sequence, wherein W is a positive integer, and wherein the preset rule comprises a first formula and a second formula; and determining, by the terminal device, a frequency location of the random access preamble based on random access configuration information and a preset rule comprises:

determining, by the terminal device based on the random access configuration information, a frequency location of a symbol group whose number is 0;

determining a frequency location of a symbol group P based on the first formula and a number i of the symbol group P; and determining a frequency location of a symbol group Q based on the second formula and a number i of the symbol group Q, wherein the symbol group P is a symbol group whose number satisfies i>0 and imod6=0 in the 6*W symbol groups, wherein the symbol group Q is a symbol group whose number satisfies i>0 and imod6≠0 in the 6*W symbol groups, and wherein mod represents a modulo operation.

3. The method according to claim 2, wherein the first formula is related to the frequency location of the symbol group whose number is 0 and a function determined based on a number i and a pseudo-random sequence, or wherein the first formula is related to a frequency location of a symbol group whose number is i−6 and a function determined based on a number i and a pseudo-random sequence; and wherein the number i is a number of the symbol group P.

4. The method according to claim 2, wherein the second formula is related to a frequency location of a symbol group whose number is i−1 and a frequency location interval and a frequency hopping direction of a symbol group whose number is i relative to the symbol group whose number is i−1, and wherein the number i is a number of the symbol group Q.

5. The method according to claim 1, wherein the first interval is 1.25 kHz, the second interval is 3.75 kHz, and the third interval is 22.5 kHz.

6. The method according to claim 1, wherein a frequency hopping direction from the first symbol group to the second symbol group is opposite to a frequency hopping direction from the fifth symbol group to the sixth symbol group, and wherein a frequency hopping direction from the second symbol group to the third symbol group is opposite to a frequency hopping direction from the fourth symbol group to the fifth symbol group.

7. The method according to claim 2, wherein the preset rule comprises a formula 1 or a formula 2;

wherein the formula 1 is:

$$\tilde{n}_{sc}^{RA}(i) = \begin{cases} (\tilde{n}_{sc}^{RA}(0) + f(i/6)) \bmod N_{sc}^{RA} & i \bmod 6 = 0 \text{ and } i > 0 \\ \tilde{n}_{sc}^{RA}(i-1) + 1 & i \bmod 6 = 1, 5 \text{ and } \tilde{n}_{sc}^{RA}(i-1) \bmod 2 = 0 \\ \tilde{n}_{sc}^{RA}(i-1) - 1 & i \bmod 6 = 1, 5 \text{ and } \tilde{n}_{sc}^{RA}(i-1) \bmod 2 = 1 \\ \tilde{n}_{sc}^{RA}(i-1) + 3 & i \bmod 6 = 2, 4 \text{ and } \lfloor \tilde{n}_{sc}^{RA}(i-1)/3 \rfloor \bmod 2 = 0; \text{ and} \\ \tilde{n}_{sc}^{RA}(i-1) - 3 & i \bmod 6 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i \bmod 6 = 3 \text{ and } \tilde{n}_{sc}^{RA}(i-1) < 18 \\ \tilde{n}_{sc}^{RA}(i-1) - 18 & i \bmod 6 = 3 \text{ and } \tilde{n}_{sc}^{RA}(i-1) \geq 18 \end{cases}$$

wherein the formula 2 is:

$$\tilde{n}_{sc}^{RA}(i) = \begin{cases} (\tilde{n}_{sc}^{RA}(i-6) + f(i/6)) \bmod N_{sc}^{RA} & i \bmod 6 = 0 \text{ and } i > 0 \\ \tilde{n}_{sc}^{RA}(i-1) + 1 & i \bmod 6 = 1, 5 \text{ and } \tilde{n}_{sc}^{RA}(i-1) \bmod 2 = 0 \\ \tilde{n}_{sc}^{RA}(i-1) - 1 & i \bmod 6 = 1, 5 \text{ and } \tilde{n}_{sc}^{RA}(i-1) \bmod 2 = 1 \\ \tilde{n}_{sc}^{RA}(i-1) + 3 & i \bmod 6 = 2, 4 \text{ and } \lfloor \tilde{n}_{sc}^{RA}(i-1)/3 \rfloor \bmod 2 = 0; \text{ and} \\ \tilde{n}_{sc}^{RA}(i-1) - 3 & i \bmod 6 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i \bmod 6 = 3 \text{ and } \tilde{n}_{sc}^{RA}(i-1) < 18 \\ \tilde{n}_{sc}^{RA}(i-1) - 18 & i \bmod 6 = 3 \text{ and } \tilde{n}_{sc}^{RA}(i-1) \geq 18 \end{cases}$$

wherein $\tilde{n}_{sc}^{RA}(i)$ is a frequency location of the symbol group whose number is i, wherein $f(i/6)$ is a function determined based on the number i of the symbol group, $N_{sc}^{RA}$, and a pseudo-random sequence, wherein $N_{sc}^{RA}$ is a transmission limitation on a random access preamble, wherein $\lfloor \; \rfloor$ represents rounding down, wherein $N_{sc}^{RA} > 0$, and wherein $\tilde{n}_{sc}^{RA}(i) \geq 0$.

8. A communication method, comprising:
   determining, by a network device, random access configuration information;
   sending the random access configuration information to a terminal device, wherein the random access configuration information is used to indicate the terminal device to determine a random access preamble, wherein the random access preamble comprises six symbol groups, and wherein the six symbol groups comprise a first symbol group, a second symbol group, a third symbol group, a fourth symbol group, a fifth symbol group, and a sixth symbol group; and
   receiving, by the network device, the random access preamble from the terminal device, wherein the random access preamble is determined based on the random access configuration information, and is sent based on a determined frequency location, wherein:
   the frequency location is determined based on the random access configuration information and a preset rule;
   a frequency interval between every two adjacent symbol groups in the six symbol groups is a frequency hopping interval;
   a frequency hopping interval between the first symbol group and the second symbol group and a frequency hopping interval between the fifth symbol group and the sixth symbol group are equal and both are first intervals;
   a frequency hopping interval between the second symbol group and the third symbol group and a frequency hopping interval between the fourth symbol group and the fifth symbol group are equal and both are second intervals;
   a frequency hopping interval between the third symbol group and the fourth symbol group is a third interval, and
   the first interval, the second interval, and the third interval are unequal and are not equal to zero.

9. The method according to claim 8, wherein the random access configuration information comprises a quantity W of repetitions of the random access preamble, wherein 6*W symbol groups comprised in the random access preamble in the W repetitions are numbered 0, 1, . . . i, . . . , 6W−2, and 6W−1 in a time sequence, wherein W is a positive integer, and wherein the random access configuration information is further used to determine a frequency location of a symbol group whose number is 0; and
   wherein the preset rule comprises a first formula and a second formula, wherein the first formula and a number i of a symbol group P are used to determine a frequency location of the symbol group P, wherein the second formula and a number i of a symbol group Q are used to determine a frequency location of the symbol group Q, wherein the symbol group P is a symbol group whose number satisfies i>0 and imod6=0 in the 6*W symbol groups, wherein the symbol group Q is a symbol group whose number satisfies i>0 and imod6≠0 in the 6*W symbol groups, and wherein mod represents a modulo operation.

10. The method according to claim 9, wherein the first formula is related to the frequency location of the symbol group whose number is 0 and a function determined based on a number i and a pseudo-random sequence, or wherein the first formula is related to a frequency location of a symbol group whose number is i−6 and a function determined based on a number i and a pseudo-random sequence; and
   wherein the number i is a number of the symbol group P.

11. The method according to claim 8, wherein the first interval is 1.25 kHz, the second interval is 3.75 kHz, and the third interval is 22.5 kHz.

12. The method according to claim 8, wherein a frequency hopping direction from the first symbol group to the second symbol group is opposite to a frequency hopping direction from the fifth symbol group to the sixth symbol group, and wherein a frequency hopping direction from the second symbol group to the third symbol group is opposite to a frequency hopping direction from the fourth symbol group to the fifth symbol group.

13. The method according to claim 9, wherein the second formula is related to a frequency location of a symbol group whose number is i-1 and a frequency location interval and a frequency hopping direction of a symbol group whose number is i relative to the symbol group whose number is i-1, and wherein the number i is a number of the symbol group Q.

14. The method according to claim 9, wherein the preset rule comprises a formula 1 or a formula 2;
   wherein the formula 1 is:

$$\tilde{n}_{sc}^{RA}(i) = \begin{cases} (\tilde{n}_{sc}^{RA}(0) + f(i/6)) \bmod N_{sc}^{RA} & i \bmod 6 = 0 \text{ and } i > 0 \\ \tilde{n}_{sc}^{RA}(i-1) + 1 & i \bmod 6 = 1, 5 \text{ and } \tilde{n}_{sc}^{RA}(i-1) \bmod 2 = 0 \\ \tilde{n}_{sc}^{RA}(i-1) - 1 & i \bmod 6 = 1, 5 \text{ and } \tilde{n}_{sc}^{RA}(i-1) \bmod 2 = 1 \\ \tilde{n}_{sc}^{RA}(i-1) + 3 & i \bmod 6 = 2, 4 \text{ and } \lfloor \tilde{n}_{sc}^{RA}(i-1)/3 \rfloor \bmod 2 = 0; \text{ and} \\ \tilde{n}_{sc}^{RA}(i-1) - 3 & i \bmod 6 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i \bmod 6 = 3 \text{ and } \tilde{n}_{sc}^{RA}(i-1) < 18 \\ \tilde{n}_{sc}^{RA}(i-1) - 18 & i \bmod 6 = 3 \text{ and } \tilde{n}_{sc}^{RA}(i-1) \geq 18 \end{cases}$$

wherein the formula 2 is:

$$\tilde{n}_{sc}^{RA}(i) = \begin{cases} (\tilde{n}_{sc}^{RA}(i-6) + f(i/6)) \bmod N_{sc}^{RA} & i \bmod 6 = 0 \text{ and } i > 0 \\ \tilde{n}_{sc}^{RA}(i-1) + 1 & i \bmod 6 = 1, 5 \text{ and } \tilde{n}_{sc}^{RA}(i-1) \bmod 2 = 0 \\ \tilde{n}_{sc}^{RA}(i-1) - 1 & i \bmod 6 = 1, 5 \text{ and } \tilde{n}_{sc}^{RA}(i-1) \bmod 2 = 1 \\ \tilde{n}_{sc}^{RA}(i-1) + 3 & i \bmod 6 = 2, 4 \text{ and } \lfloor \tilde{n}_{sc}^{RA}(i-1)/3 \rfloor \bmod 2 = 0; \text{ and} \\ \tilde{n}_{sc}^{RA}(i-1) - 3 & i \bmod 6 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i \bmod 6 = 3 \text{ and } \tilde{n}_{sc}^{RA}(i-1) < 18 \\ \tilde{n}_{sc}^{RA}(i-1) - 18 & i \bmod 6 = 3 \text{ and } \tilde{n}_{sc}^{RA}(i-1) \geq 18 \end{cases}$$

wherein $\tilde{n}_{sc}^{RA}(i)$ is a frequency location of the symbol group whose number is i, wherein f(i/6) is a function determined based on the number i of the symbol group, $N_{sc}^{RA}$, and a pseudo-random sequence, wherein $N_{sc}^{RA}$ is a transmission limitation on a random access preamble, wherein ⌊ ⌋ represents rounding down, wherein $N_{sc}^{RA}>0$, and wherein $\tilde{n}_{sc}^{RA}(i) \geq 0$.

15. A communications device, comprising:
at least one processor; and
a memory storing instructions executable by the at least one processor, wherein the instructions, when executed by the at least one processor, cause the communications device to:
    determine a random access preamble, wherein the random access preamble comprises six symbol groups, wherein the six symbol groups comprise a first symbol group, a second symbol group, a third symbol group, a fourth symbol group, a fifth symbol group, and a sixth symbol group;
    determine a frequency location of the random access preamble based on random access configuration information and a preset rule, wherein:
        a frequency interval between every two adjacent symbol groups in the six symbol groups is a frequency hopping interval;
        a frequency hopping interval between the first symbol group and the second symbol group and a frequency hopping interval between the fifth symbol group and the sixth symbol group are equal and both are first intervals;
        a frequency hopping interval between the second symbol group and the third symbol group and a frequency hopping interval between the fourth symbol group and the fifth symbol group are equal and both are second intervals;
        a frequency hopping interval between the third symbol group and the fourth symbol group is a third interval; and
        the first interval, the second interval, and the third interval are unequal and are not equal to zero; and
    send the random access preamble to a network device based on the frequency location.

16. The communications device according to claim 15, wherein the first interval is 1.25 kHz, the second interval is 3.75 kHz, and the third interval is 22.5 kHz.

17. The communications device according to claim 15, wherein a frequency hopping direction from the first symbol group to the second symbol group is opposite to a frequency hopping direction from the fifth symbol group to the sixth symbol group, and wherein a frequency hopping direction from the second symbol group to the third symbol group is opposite to a frequency hopping direction from the fourth symbol group to the fifth symbol group.

18. The communications device according to claim 15, wherein the random access configuration information comprises a quantity W of repetitions of the random access preamble, wherein 6*W symbol groups comprised in the random access preamble in the W repetitions are numbered 0, 1, . . . , 6W−2, and 6W−1 in a time sequence, wherein W is a positive integer, and wherein the preset rule comprises a first formula and a second formula; and
    wherein the instructions further cause the communications device to:
        determine, based on the random access configuration information, a frequency location of a symbol group whose number is 0;
        determine a frequency location of a symbol group P based on the first formula and a number i of the symbol group P; and
        determine a frequency location of a symbol group Q based on the second formula and a number i of the symbol group Q,
    wherein the symbol group P is a symbol group whose number satisfies i>0 and imod6=0 in the 6*W symbol groups, wherein the symbol group Q is a symbol group whose number satisfies i>0 and imod6≠0 in the 6*W symbol groups, and wherein mod represents a modulo operation.

19. The communications device according to claim 18, wherein the first formula is related to the frequency location of the symbol group whose number is 0 and a function determined based on a number i and a pseudo-random sequence, or wherein the first formula is related to a frequency location of a symbol group whose number is i−6 and a function determined based on a number i and a pseudo-random sequence; and
    wherein the number i is a number of the symbol group P.

20. The communications device according to claim 18, wherein the second formula is related to a frequency location of a symbol group whose number is i−1 and a frequency location interval and a frequency hopping direction of a symbol group whose number is i relative to the symbol group whose number is i−1, and wherein the number i is a number of the symbol group Q.

21. The communications device according to claim 18, wherein the preset rule comprises a formula 1 or a formula 2;
wherein the formula 1 is:

$$\tilde{n}_{sc}^{RA}(i) = \begin{cases} (\tilde{n}_{sc}^{RA}(0) + f(i/6)) \bmod N_{sc}^{RA} & i \bmod 6 = 0 \text{ and } i > 0 \\ \tilde{n}_{sc}^{RA}(i-1) + 1 & i \bmod 6 = 1, 5 \text{ and } \tilde{n}_{sc}^{RA}(i-1) \bmod 2 = 0 \\ \tilde{n}_{sc}^{RA}(i-1) - 1 & i \bmod 6 = 1, 5 \text{ and } \tilde{n}_{sc}^{RA}(i-1) \bmod 2 = 1 \\ \tilde{n}_{sc}^{RA}(i-1) + 3 & i \bmod 6 = 2, 4 \text{ and } \lfloor \tilde{n}_{sc}^{RA}(i-1)/3 \rfloor \bmod 2 = 0 \\ \tilde{n}_{sc}^{RA}(i-1) - 3 & i \bmod 6 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i \bmod 6 = 3 \text{ and } \tilde{n}_{sc}^{RA}(i-1) < 18 \\ \tilde{n}_{sc}^{RA}(i-1) - 18 & i \bmod 6 = 3 \text{ and } \tilde{n}_{sc}^{RA}(i-1) \geq 18 \end{cases} ;$$

wherein the formula 2 is:

$$\tilde{n}_{sc}^{RA}(i) = \begin{cases} (\tilde{n}_{sc}^{RA}(i-6) + f(i/6)) \bmod N_{sc}^{RA} & i \bmod 6 = 0 \text{ and } i > 0 \\ \tilde{n}_{sc}^{RA}(i-1) + 1 & i \bmod 6 = 1, 5 \text{ and } \tilde{n}_{sc}^{RA}(i-1) \bmod 2 = 0 \\ \tilde{n}_{sc}^{RA}(i-1) - 1 & i \bmod 6 = 1, 5 \text{ and } \tilde{n}_{sc}^{RA}(i-1) \bmod 2 = 1 \\ \tilde{n}_{sc}^{RA}(i-1) + 3 & i \bmod 6 = 2, 4 \text{ and } \lfloor \tilde{n}_{sc}^{RA}(i-1)/3 \rfloor \bmod 2 = 0 \\ \tilde{n}_{sc}^{RA}(i-1) - 3 & i \bmod 6 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i \bmod 6 = 3 \text{ and } \tilde{n}_{sc}^{RA}(i-1) < 18 \\ \tilde{n}_{sc}^{RA}(i-1) - 18 & i \bmod 6 = 3 \text{ and } \tilde{n}_{sc}^{RA}(i-1) \geq 18 \end{cases} ;$$

wherein $\tilde{n}_{sc}^{RA}(i)$ is a frequency location of the symbol group whose number is i, wherein $f(i/6)$ is a function determined based on the number i of the symbol group, $N_{sc}^{RA}$, and a pseudo-random sequence, wherein $N_{sc}^{RA}$ is a transmission limitation on a random access preamble, wherein ⌊ ⌋ represents rounding down, wherein $N_{sc}^{RA} > 0$, and wherein $\tilde{n}_{sc}^{RA}(i) \geq 0$.

22. A network device, comprising:
at least one processor; and
a memory storing instructions executable by the at least one processor, wherein the instructions, when executed by the at least one processor, cause the network device to:
   determine random access configuration information;
   send the random access configuration information to a terminal device by using a transmitter of the network device, wherein the random access configuration information is used to indicate the terminal device to determine a random access preamble, wherein the random access preamble comprises six symbol groups, and wherein the six symbol groups comprise a first symbol group, a second symbol group, a third symbol group, a fourth symbol group, a fifth symbol group, and a sixth symbol group; and
   receive the random access preamble from the terminal device, wherein the random access preamble is determined based on the random access configuration information, and is sent based on a determined frequency location, wherein:
      the frequency location is determined based on the random access configuration information and a preset rule;
      a frequency interval between every two adjacent symbol groups in the six symbol groups is a frequency hopping interval;
      a frequency hopping interval between the first symbol group and the second symbol group and a frequency hopping interval between the fifth symbol group and the sixth symbol group are equal and both are first intervals;
      a frequency hopping interval between the second symbol group and the third symbol group and a frequency hopping interval between the fourth symbol group and the fifth symbol group are equal and both are second intervals;
      a frequency hopping interval between the third symbol group and the fourth symbol group is a third interval; and
      the first interval, the second interval, and the third interval are unequal and are not equal to zero.

23. The network device according to claim 22, wherein the first interval is 1.25 kHz, the second interval is 3.75 kHz, and the third interval is 22.5 kHz.

24. The network device according to claim 22, wherein a frequency hopping direction from the first symbol group to the second symbol group is opposite to a frequency hopping direction from the fifth symbol group to the sixth symbol group, and wherein a frequency hopping direction from the second symbol group to the third symbol group is opposite to a frequency hopping direction from the fourth symbol group to the fifth symbol group.

25. The network device according to claim 22, wherein the random access configuration information comprises a quantity W of repetitions of the random access preamble, wherein 6*W symbol groups comprised in the random access preamble in the W repetitions are numbered 0, 1, . . . i, . . . , 6W−2, and 6W−1 in a time sequence, wherein W is a positive integer, and wherein the random access configuration information is further used to determine a frequency location of a symbol group whose number is 0; and
wherein the preset rule comprises a first formula and a second formula, wherein the first formula and a number i of a symbol group P are used to determine a frequency location of the symbol group P, wherein the second formula and a number i of a symbol group Q are used to determine a frequency location of the symbol group Q, wherein the symbol group P is a symbol group whose number satisfies i>0 and imod6=0 in the 6*W symbol groups, wherein the symbol group Q is a symbol group whose number satisfies i>0 and imod6≠0 in the 6*W symbol groups, and wherein mod represents a modulo operation.

26. The network device according to claim 25, wherein the second formula is related to a frequency location of a symbol group whose number is i−1 and a frequency location interval and a frequency hopping direction of a symbol group whose number is i relative to the symbol group whose number is i−1, and wherein the number i is a number of the symbol group Q.

27. The network device according to claim 25, wherein the preset rule comprises a formula 1 or a formula 2;
wherein the formula 1 is:

$$\tilde{n}_{sc}^{RA}(i) = \begin{cases} (\tilde{n}_{sc}^{RA}(0) + f(i/6)) \bmod N_{sc}^{RA} & i\bmod 6 = 0 \text{ and } i > 0 \\ \tilde{n}_{sc}^{RA}(i-1) + 1 & i\bmod 6 = 1, 5 \text{ and } \tilde{n}_{sc}^{RA}(i-1)\bmod 2 = 0 \\ \tilde{n}_{sc}^{RA}(i-1) - 1 & i\bmod 6 = 1, 5 \text{ and } \tilde{n}_{sc}^{RA}(i-1)\bmod 2 = 1 \\ \tilde{n}_{sc}^{RA}(i-1) + 3 & i\bmod 6 = 2, 4 \text{ and } \lfloor \tilde{n}_{sc}^{RA}(i-1)/3 \rfloor \bmod 2 = 0 \\ \tilde{n}_{sc}^{RA}(i-1) - 3 & i\bmod 6 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i\bmod 6 = 3 \text{ and } \tilde{n}_{sc}^{RA}(i-1) < 18 \\ \tilde{n}_{sc}^{RA}(i-1) - 18 & i\bmod 6 = 3 \text{ and } \tilde{n}_{sc}^{RA}(i-1) \geq 18 \end{cases} ;$$

and
wherein the formula 2 is:

$$\tilde{n}_{sc}^{RA}(i) = \begin{cases} (\tilde{n}_{sc}^{RA}(i-6) + f(i/6)) \bmod N_{sc}^{RA} & i\bmod 6 = 0 \text{ and } i > 0 \\ \tilde{n}_{sc}^{RA}(i-1) + 1 & i\bmod 6 = 1, 5 \text{ and } \tilde{n}_{sc}^{RA}(i-1)\bmod 2 = 0 \\ \tilde{n}_{sc}^{RA}(i-1) - 1 & i\bmod 6 = 1, 5 \text{ and } \tilde{n}_{sc}^{RA}(i-1)\bmod 2 = 1 \\ \tilde{n}_{sc}^{RA}(i-1) + 3 & i\bmod 6 = 2, 4 \text{ and } \lfloor \tilde{n}_{sc}^{RA}(i-1)/3 \rfloor \bmod 2 = 0 \\ \tilde{n}_{sc}^{RA}(i-1) - 3 & i\bmod 6 = 2, 4 \text{ and } \lfloor \tilde{n}_{sc}^{RA}(i-1)/3 \rfloor \bmod 2 = 1 \\ \tilde{n}_{sc}^{RA}(i-1) + 18 & i\bmod 6 = 3 \text{ and } \tilde{n}_{sc}^{RA}(i-1) < 18 \\ \tilde{n}_{sc}^{RA}(i-1) - 18 & i\bmod 6 = 3 \text{ and } \tilde{n}_{sc}^{RA}(i-1) \geq 18 \end{cases} ;$$

wherein $\tilde{n}_{sc}^{RA}(i)$ is a frequency location of the symbol group whose number is i, wherein $f(i/6)$ is a function determined based on the number i of the symbol group, $N_{sc}^{RA}$, and a pseudo-random sequence, wherein $N_{sc}^{RA}$ is a transmission limitation on a random access preamble, wherein $\lfloor \ \rfloor$ represents rounding down, wherein $N_{sc}^{RA} > 0$, and wherein $\tilde{n}_{sc}^{RA}(i) \geq 0$.

28. The network device according to claim 25, wherein the first formula is related to the frequency location of the symbol group whose number is 0 and a function determined based on a number i and a pseudo-random sequence, or wherein the first formula is related to a frequency location of a symbol group whose number is i-6 and a function determined based on a number i and a pseudo-random sequence; and wherein the number i is a number of the symbol group P.

* * * * *

UNITED STATES PATENT AND TRADEMARK OFFICE
CERTIFICATE OF CORRECTION

PATENT NO. : 11,470,636 B2
APPLICATION NO. : 16/991351
DATED : October 11, 2022
INVENTOR(S) : Yuwan Su et al.

It is certified that error appears in the above-identified patent and that said Letters Patent is hereby corrected as shown below:

In the Claims

In Column 49-50, Line 36, In Claim 7, delete "mod 2" and insert -- mod2 --.

In Column 49-50, Line 38, In Claim 7, delete "mod 2" and insert -- mod2 --.

In Column 49-50, Line 39 (Approx.), In Claim 7, delete "$\bar{n}_{sc}^{RA}(i-1)-3$" and insert -- $\tilde{n}_{sc}^{RA}(i-1)-3$ --.

In Column 49-50, Line 39 (Approx.), In Claim 7, delete "mod 2" and insert -- mod2 --.

In Column 49-50, Line 47 (Approx.), In Claim 7, delete "mod 2" and insert -- mod2 --.

In Column 49-50, Line 49 (Approx.), In Claim 7, delete "mod 2" and insert -- mod2 --.

In Column 49-50, Line 49 (Approx.), In Claim 7, delete "0; and" and insert -- 0; --.

In Column 49-50, Line 50 (Approx.), In Claim 7, delete "$\bar{n}_{sc}^{RA}(i-1)-3$" and insert -- $\tilde{n}_{sc}^{RA}(i-1)-3$ --.

In Column 49-50, Line 50 (Approx.), In Claim 7, delete "mod 2" and insert -- mod2 --.

In Column 51, Line 40 (Approx.), In Claim 9, delete "1, . . . i, . . . ," and insert -- 1, . . . , i, . . . , --.

In Column 51-52, Line 44, In Claim 14, delete "mod 2" and insert -- mod2 --.

In Column 51-52, Line 46, In Claim 14, delete "mod 2" and insert -- mod2 --.

In Column 51-52, Line 47 (Approx.), In Claim 14, delete "$\bar{n}_{sc}^{RA}(i-1)-3$" and insert -- $\tilde{n}_{sc}^{RA}(i-1)-3$ --.

Signed and Sealed this
Fourth Day of April, 2023

Katherine Kelly Vidal
*Director of the United States Patent and Trademark Office*

CERTIFICATE OF CORRECTION (continued)
U.S. Pat. No. 11,470,636 B2

In Column 51-52, Line 47, In Claim 14, delete "mod 2" and insert -- mod2 --.

In Column 51-52, Line 54, In Claim 14, delete "mod 2" and insert -- mod2 --.

In Column 51-52, Line 56, In Claim 14, delete "mod 2" and insert -- mod2 --.

In Column 51-52, Line 56 (Approx.), In Claim 14, delete "0; and" and insert -- 0; --.

In Column 51-52, Line 57 (Approx.), In Claim 14, delete "$\bar{n}_{sc}^{RA}(i-1)-3$" and insert -- $\tilde{n}_{sc}^{RA}(i-1)-3$ --.

In Column 51-52, Line 57, In Claim 14, delete "mod 2" and insert -- mod2 --.

In Column 53, Line 60, In Claim 18, delete "1, . . . ," and insert -- 1, . . . , i, . . . , --.

In Column 54, Line 41-42 (Approx.), In Claim 21, delete "$\lfloor \tilde{n}_{sc}^{RA}(i-1)/3 \rfloor \bmod 2 = 0$" and insert -- $i \bmod 6 = 2, 4$ and $\lfloor \tilde{n}_{sc}^{RA}(i-1)/3 \rfloor \bmod 2 = 0$ ; and --.

In Column 55, Line 67, In Claim 25, delete "1, . . . i, . . . ," and insert -- 1, . . . , i, . . . , --.